United States Patent

(12) United States Patent
Harmon et al.

(10) Patent No.: US 9,787,723 B2
(45) Date of Patent: Oct. 10, 2017

(54) DEVICES AND METHODS FOR THREAT-BASED AUTHENTICATION FOR ACCESS TO COMPUTING RESOURCES

(71) Applicant: Ping Identity Corporation, Denver, CO (US)

(72) Inventors: Mance Harmon, Cedar Park, TX (US); Leemon C. Baird, III, Cedar Park, TX (US); David Chase, Denver, CO (US); David Waite, Denver, CO (US)

(73) Assignee: Ping Identify Corporation, Denver, CO (US)

( * ) Notice: Subject to any disclaimer, the term of this patent is extended or adjusted under 35 U.S.C. 154(b) by 0 days.

(21) Appl. No.: 14/801,203

(22) Filed: Jul. 16, 2015

(65) Prior Publication Data

US 2016/0021117 A1 Jan. 21, 2016

Related U.S. Application Data

(60) Provisional application No. 62/026,362, filed on Jul. 18, 2014.

(51) Int. Cl.
*G06F 21/00* (2013.01)
*H04L 29/06* (2006.01)
*H04L 29/08* (2006.01)

(52) U.S. Cl.
CPC .............. *H04L 63/20* (2013.01); *H04L 63/08* (2013.01); *H04L 63/105* (2013.01); *H04L 67/306* (2013.01)

(58) Field of Classification Search
CPC ..... H04L 63/102; H04L 63/105; H04L 63/08; H04L 63/0861; H04L 67/306;
(Continued)

(56) References Cited

U.S. PATENT DOCUMENTS

2012/0185910 A1* 7/2012 Miettinen ............... G06F 21/31
726/1
2012/0232679 A1* 9/2012 Abercrombie ......... G06Q 10/04
700/44

(Continued)

OTHER PUBLICATIONS

International Search Report and Written Opinion for International Application No. PCT/US2015/040923 mailed on Oct. 9, 2015.

*Primary Examiner* — Kendall Dolly
(74) *Attorney, Agent, or Firm* — Cooley LLP

(57) ABSTRACT

In some embodiments, a method includes receiving, at a host device, a signal indicative of an authentication request for a client device to access a resource from a set of resources. A resource confidence value associated with the authentication request is calculated based at least in part on (1) a threat confidence vector associated with at least one risk mitigation score for each threat from a set of threats and (2) a set of resource vulnerability scores associated with the resource and each threat from the set of threats. The resource confidence value is compared to a resource confidence criterion associated with the resource from the set of resources. A signal indicative of a positive authentication is sent from the host device to the client device when the resource confidence value satisfies the resource confidence criterion such that the client device is granted access to the resource.

22 Claims, 8 Drawing Sheets

(58) Field of Classification Search
CPC . H04L 63/0838; H04L 63/1433; H04L 63/20; H04L 63/0807
See application file for complete search history.

(56) References Cited

U.S. PATENT DOCUMENTS

2012/0266227 A1* 10/2012 Colson .................... G06F 21/34
                                                        726/7
2013/0104236 A1    4/2013  Ray et al.
2013/0247205 A1    9/2013  Schrecker et al.

* cited by examiner

Risk Mitigation Table 155
Threats

| | | | | |
|---|---|---|---|---|
| M11 | M12 | M13 | M14 | M15 |
| M21 | M22 | M23 | M24 | M25 |
| M31 | M32 | M33 | M34 | M35 |
| M41 | M42 | M43 | M44 | M45 |
| M51 | M52 | M53 | M54 | M55 |
| M61 | M62 | M63 | M64 | M65 |

AuthN Modes

Policy

Resource Vulnerability Table 165
Resources

| | | | | |
|---|---|---|---|---|
| R11 | R12 | R13 | R14 | R15 |
| R21 | R22 | R23 | R24 | R25 |
| R31 | R32 | R33 | R34 | R35 |
| R41 | R42 | R43 | R44 | R45 |
| R51 | R52 | R53 | R54 | R55 |

Threats

Policy

FIG. 3

Risk Mitigation Table 355

AuthN Methods / Threats

|  | Remote | Local | Stolen Credentials |
|---|---|---|---|
| Password | 0.2 | 0.2 | 0.0 |
| User ID | 0.3 | 0.3 | 0.0 |
| IP Address | 0.1 | 0.2 | 0.1 |
| Geolocation | 0.2 | 0.3 | 0.4 |

AuthN Mode Vector 350

Active { Password: 1, User ID: 0, IP Address: 0 }
Passive { Geolocation: 0 }

Wait — re-reading: Active: Password 1, User ID 0; Passive: IP Address 1, Geolocation 0

X

=

Threat Confidence Vector 360

| Remote | Local | Stolen Credentials |
|---|---|---|
| 0.3 | 0.4 | 0.1 |

Resource Vulnerability Table 365

Threats / Resources

|  | R1 | R2 | R3 |
|---|---|---|---|
| Remote | 0.2 | 0.2 | 0.7 |
| Local | 0.3 | 0.4 | 0.6 |
| Stolen Credentials | 0.5 | 0.5 | 0.6 |

X

Threat Confidence Vector 360

| Remote | Local | Stolen Credentials |
|---|---|---|
| 0.3 | 0.4 | 0.1 |

=

Resource Confidence Vector 370

| R1 | R2 | R3 |
|---|---|---|
| 0.23 | 0.36 | 0.51 |

Resource Confidence Thresholds 375

| R1 | R2 | R3 |
|---|---|---|
| 0.15 | 0.2 | 0.25 |

FIG. 8

DEVICES AND METHODS FOR THREAT-BASED AUTHENTICATION FOR ACCESS TO COMPUTING RESOURCES

CROSS-REFERENCE TO RELATED APPLICATION

This application claims priority to and the benefit of U.S. Provisional Application No. 62/026,362, filed Jul. 18, 2014 and titled "Devices and Methods for Threat-Based Authentication," which is incorporated herein by reference in its entirety.

BACKGROUND

The embodiments described herein relate generally to electronic authentication for access to computing resources, and more particularly, to devices and methods for threat-based authentication.

An increase in the capabilities of electronic devices has led to a large expansion in the manner in which such electronic devices are used. In some instances, personal and/or otherwise sensitive information (or data representing such information) can be accessed through the use of an electronic device and in general, such information is meant to be accessed by a single user or a select group of users, while access to that information by users other than the user of the select group of users is restricted. Thus, some systems and/or devices can authenticate the identity of a user based on a set of credentials. In most cases, authentication is based on at least one of "what you have," "what you know," or "what you are." For example, a user can be authenticated using a "what you have" method via an electronic device, a magnetic device, or combination thereof such as, a mobile electronic device (e.g., a smartphone, tablet, ultrabook, laptop, personal digital assistant (PDA), etc.), a key fob, a card or the like including a magnetic and/or electromagnetic component, etc.; a user can be authenticated using a "what you know" method via input of a user password, personal identification number (PIN), unique pattern on a touch screen, answer to a question, and/or the like; and a user can be authenticated using a "what you are" method via an input of, for example, biometric data such as a fingerprint scan, an electrocardiogram (EKG), a retina scan, gait characteristics, and/or the like.

In some instances, access to, for example, an at least partially restricted physical entity (e.g., location, building, section or room within a building, etc.), data, network, and/or the like may be based on the authentication of one or a combination of active (e.g., a input of a user password, PIN, or other credential via a set of keystrokes, voice command, touch screen inputs, mouse clicks, etc.) and/or passive (e.g., a biometric reading, gait characteristics, internet protocol (IP) address, geolocation, time, historical patterns, and/or the like) credentials associated with a user. In an effort to mitigate the risk of unauthorized access, some systems may provide access based on multiple active and/or passive authentication modes. For example, some such systems can use a string of Boolean expressions to define an authentication mode. Such Boolean expressions, however, can be complex and/or difficult to manage when scaled to include a larger number of inputs.

In some instances, a system can use, for example, risk-based authentication (RBA) methods to mitigate the risk of unauthorized access. Such RBA methods are based on a risk profile associated with a user, a device, and/or a physical entity in which, higher risk is associated with increased and/or more challenging authorization methods. Such systems can have relatively high false positive and/or false negative results. Moreover, some such RBA methods do not determine, define, and/or compute why or what characteristics influenced a given risk score, rather an output is simply a value.

Thus, a need exists for improved apparatus and methods for threat-based authentication.

SUMMARY

In some embodiments, a method includes receiving, at a host device, a signal indicative of an authentication request for a client device to access a resource from a set of resources. A resource confidence value associated with the authentication request is calculated based at least in part on (1) a threat confidence vector associated with at least one risk mitigation score for each threat from a set of threats and (2) a set of resource vulnerability scores associated with the resource and each threat from the set of threats. The resource confidence value is compared to a resource confidence criterion associated with the resource from the set of resources. A signal indicative of a positive authentication is sent from the host device to the client device when the resource confidence value satisfies the resource confidence criterion such that the client device is granted access to the resource.

BRIEF DESCRIPTION OF THE DRAWINGS

FIG. 3 is an illustration of a portion of an authentication policy according to an embodiment.

FIGS. 7 and 8 are illustrations of a process executed in a processor each according to a different embodiment.

DETAILED DESCRIPTION

Figure 1:
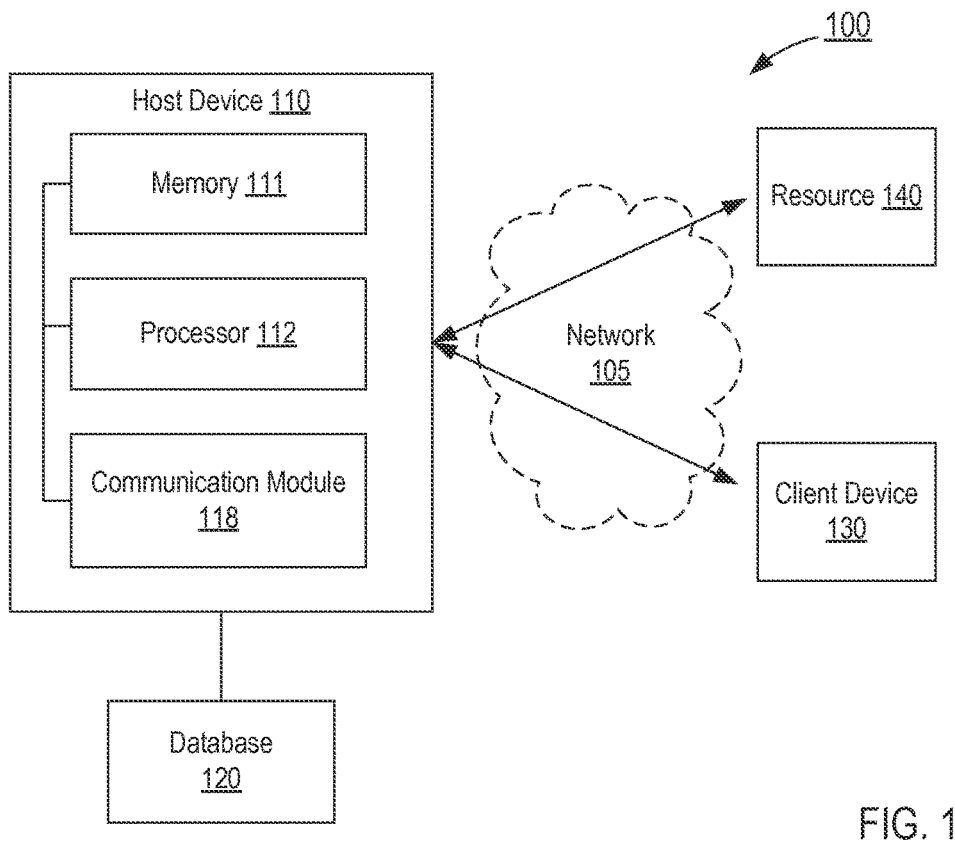
FIG. 1 is a schematic illustration of a threat-based authentication system according to an embodiment.

The embodiments described herein relate to devices and methods for threat-based authentication. In some embodiments, a method includes receiving, at a host device, a signal indicative of an authentication request for a resource from a set of resources. A resource confidence value associated with the authentication request is calculated based at least in part on (1) a threat confidence vector associated with at least one risk mitigation score for each threat from a set of threats and (2) a set of resource vulnerability scores associated with the resource and each threat from the set of threats. The resource confidence value is compared to a resource confidence criterion associated with the resource from the set of resources. A signal indicative of a positive authentication is sent from the host device to the client device when the resource confidence value satisfies the resource confidence criterion.

In some embodiments, a method includes receiving, at a host device, a signal indicative of an authentication request for a client device to access a resource including data associated with a first authentication mode and data associated with a second authentication mode different from the first authentication mode. A threat confidence vector is calculated based on (1) a risk mitigation score associated with the first authentication mode and a set of threats, and (2) a risk mitigation score associated with the second authentication mode and the set of threats. A resource confidence value associated with the resource is calculated. The resource confidence value is based on (1) the threat confidence vector and (2) a set of resource vulnerability scores associated with the resource and each threat from the set of threats. The resource confidence value is compared to a resource confidence criterion associated with the resource. A signal indicative of a positive authentication is sent from the host device to the client device when the resource confidence value satisfies the resource confidence criterion. Such a positive authentication can grant the client device access to the resource.

In some embodiments, an apparatus includes a communication module implemented in at least one of a memory or a processor and configured to electronically communicate with a set of resources and a client device. The apparatus also includes a policy definition module, a policy application module, and an authentication module. The policy definition module is configured to define a resource confidence criterion for each resource from the set of resources based on (1) a threat confidence vector associated with a set of risk mitigation scores for each threat from a set of threats and (2) a set of resource vulnerability scores for each threat from the set of threats. The authentication module is configured to authenticate and/or validate a user using one or more authentication modes. Similarly stated, the authentication module 115 is configured to verify credentials and/or data provided by the user and associated with one or more authentication modes. The policy application module is configured to (1) receive a signal via the communication module, which is indicative of an authentication request (e.g., from the authentication module) associated with a resource from the set of resources and (2) define a resource confidence value for the resource from the set of resources based on a threat confidence vector associated with the authentication request and the set of resource vulnerability scores. The policy application module is also configured to (1) compare the resource confidence value for the resource from the set of resources and the resource confidence criterion for the resource from the set of resources and (2) send a signal via the communication module indicative of a positive authentication to the client device when the resource confidence criterion for the resource from the set of resources is satisfied. Such a positive authentication can grant the client device access to the resource.

Methods and apparatus described herein increase security associated with access to a resource (e.g., a server, a database, a website, a network, a workstation, an access point, etc.). For example, the methods and apparatus described herein tailor a security policy of the resource to increase security against and/or mitigate the potential for the most likely and/or harmful threats to that particular resource. Similarly stated, the security policy and the authentication modes selected to authenticate a user to a specific resource can be both resource and threat specific. Additionally, such a security policy reduces the burden on a user when the occurrence of a type of security threat is unlikely and/or not likely to cause much harm. Accordingly, an authentication policy associated with a resource can be designed to mitigate the most likely threats for that particular resource while minimizing and/or reducing the burden on a user.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the term "threat" generally refers to a device and/or methods used to gain unauthorized access to a device (e.g., an electronic device), a network or portion of a network, a physical location, etc. For example, a threat can be a confidence threat such as a phishing scheme via email, Internet, telephone, person-to-person, etc.; a remote threat such as a spoofing scheme (e.g., look-alike websites, simulated browsers, etc.), iframe exploits, browser exploits, dynamic name system (DNS) poisoning, network traffic sniffing, proxy poisoning, etc.; a local threat such as software vulnerability, browser toolbars, browser address bar spoofing, trojan horses, modified software, fake products (e.g., fake anti-virus software, etc.), spyware (e.g., keygens, keyloggers, mouse/screen snapshotters, etc.), backdoors, viruses, TEMPEST (i.e., spying techniques), malware, malicious hardware modification (e.g., token modifications, token substitution, authorization device substitution and/or emulation), compromised cookies, prevention of storing a cookie, etc.; stolen, lost, or otherwise obtained credentials via, for example, sharing passwords, writing down passwords, using weak passwords, using one password for multiple access points, not preventing one from watching as a password is entered, stealing of physical credentials (e.g., a key fob, access card, key, etc.), weak lost-password procedures, using store or "remember" password techniques, etc.; denial of service (DoS) or distributed denial of service (DDoS) attacks; and/or any other threat. While a specific list "threats" is described above, it is not meant to be an exhaustive list of potential threats that affect an electronic device, a network or portion thereof, a physical access point, etc. Rather, the list of threats is provided by way of example and not meant to be exhaustive or otherwise exclusive.

FIG. 1 is a schematic illustration of a threat-based authentication system 100 according to an embodiment. In some instances, the threat-based authentication system 100 (also referred to herein as "system") can be used to authenticate and/or verify a set of credentials, privileges, and/or levels of access associated with a user and/or a resource (e.g., an electronic and/or magnetic device). At least a portion of the system 100 can be, for example, represented and/or described by a set of instructions or code stored in a memory and executed in a processor of an electronic device (e.g., a host device, a server or group of servers, a personal computer (PC), a network device, etc.) and/or the like. As such, the system 100 can be used to mitigate a risk of unauthorized access to an electronic device, a network or portion of a network, a physical location, and/or the like. More particularly, the system 100 can be used to authenticate an identity (e.g., an identity of a human and/or a device) to mitigate the risk of unauthorized access based at least in part on a set of threats known to impact one or more resources or the like. In some embodiments, the system 100 can be used to grant access to one or more resources based on the authenticated identity.

The system 100 includes a host device 110 in communication with at least one client device 130 and at least one resource 140. The host device 110 can be any suitable host device such as a server or group of servers, a network management device, a personal computer (PC), a processing unit, and/or the like in electronic communication with the client device 130 and the resource 140. For example, in some embodiments, the host device 110 can be a server or group of servers in electronic communication with the electronic device 130 and the resource 140 via a network 105. In other embodiments, the host device 110 can be electronically connected with the client device 130 and/or or the resource 140 directly (e.g., not via the network 105).

The resource 140 can be any suitable electronic device, network, network location, network device, server, access point, website, physical structure (e.g., a building), portion of a physical structure (e.g., a room), and/or the like that can include, contain, or store at least partially restricted data, information, items, and/or the like. In some embodiments, the resource 140 can be and/or can include an intermediate device or the like that can receive data associated with one or more authentication modes from the client device 130 and in response, can send data associated with the one or more authentication modes to the host device 110. Specifically, in one instance, such a resource 140 can be an access point configured to control access to a physical location (e.g., a proximity sensor, an infrared (IR) scanner, a radio frequency (RF) transceiver, and/or the like configured to read a key card, a key fob, and/or similar identification card or credential). In other instances, the resource 140 can be operably coupled to and/or otherwise included in the host device 110. For example, a resource 140 can include a first module (e.g., a hardware module and/or software module as described above) or the like configured to receive authentication data (i.e., configured to function as a resource) and a second module or the like configured to process the authentication data to allow or deny access (i.e., configured to function as a host device). In still other embodiments, the resource 140 can be included in and/or can be the client device 130. For example, in some instances, an authentication action and/or process is performed to "login" to the client device 130 and/or to access a software module or application.

The client device 130 can be any suitable device such as a PC, a laptop, a convertible laptop, a tablet, a personal digital assistant (PDA), a smart phone, a wearable electronic device (e.g., a smart watch, etc.), a credential, a key fob, a keycard, and/or the like, as described in further detail herein. Although not shown in FIG. 1, in some embodiments, the client device 130 can be an electronic device that includes at least a memory, a processor, a communication module, and one or more user interfaces. The memory, the processor, the communication module, and the user interface(s) can be connected and/or electrically coupled to each other such as to allow signals to be sent therebetween. For example, in some embodiments, the memory can be a random access memory (RAM), a memory buffer, a hard drive, a read-only memory (ROM), an erasable programmable read-only memory (EPROM), and/or the like. The processor can be any suitable processing device configured to run or execute a set of instructions or code (e.g., stored in the memory) such as a general-purpose processor, a central processing unit (CPU), an accelerated processing unit (APU), and Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like. More specifically, the processor can execute a set of instructions or code stored in the memory associated with sending authentication data to and/or receiving authentication data from the host device 110, as described in further detail herein.

The communication module of the client device 130 can be any suitable module and/or device that can place the resource in communication with the host device 110 such as one or more network interface cards or the like. Such a network interface card can include, for example, an Ethernet port, a WiFi® radio, a Bluetooth® radio, a near field communication (NFC) radio, and/or a cellular radio that can place the client device 130 in communication with the host device 110 via a network or the like. The user interface can be, for example, a display, a speaker, a microphone, a biometric scanner or reader, and/or the like. For example, the user interface can be a display such as a cathode ray tube (CRT) monitor, a liquid crystal display (LCD) monitor, a light emitting diode (LED) monitor, and/or the like that can graphically represent any suitable portion of the system 100 (e.g., a graphical user interface (GUI) associated with a webpage, PC application, mobile application, and/or the like). In some embodiments, such a display can be and/or can include a touch screen configured to receive a haptic user input. In some instances, the user interface can be configured to receive and/or perform an authentication action (e.g., performing a biometric scan, receiving an audio or haptic input, and/or the like), as described in further detail herein. In some embodiments, the client device 130 can also include one or more sensors that can be configured to sense and/or determine one or more conditions, states, positions, movements, etc. of the client device 130 and/or a user of the client device 130. For example, such a sensor can be, for example, an accelerometer, gyroscope, a pressure sensor, etc.

In some embodiments, the client device 130 can be in communication with the host device 110 via one or more networks. For example, as shown in FIG. 1, the client device 130 can be in communication with the host device 110 via its communication module and the network 105. The network 105 can be any type of network such as, for example, a local area network (LAN), a virtual network such as a virtual local area network (VLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network 105 can be implemented as a wireless local area network (WLAN) based on the Institute of Electrical and Electronics Engineers (IEEE) 802.11 standards (also known as "WiFi®"). Moreover, the network 105 can include a combination of networks of any type such as, for example, a LAN or WLAN and the Internet. In some embodiments, the client device 130 can communicate with the host device 110 and the network 105 via intermediate networks and/or alternate networks (not shown), which can be a similar to or different from the network 105. As such, the client device 130 can send data to and/or receive data from the host device 110 using multiple communication modes (e.g., associated with any of the networks described above) that may or may not be transmitted to the host device 110 using a common network. For example, the client device 130 can be a mobile telephone (e.g., smart phone) connected to the host device 110 via a cellular network and the Internet (e.g., network 105).

The host device 110 can be any suitable device configured to send data to and/or receive data from the client device 130 and/or the resource 140. In some embodiments, the host device 110 can function as, for example, a server device (e.g., a web server device), a network management device, an administrator device, and/or so forth. The host device 110 includes at least a memory 111, a processor 112, and a communication module 118. As shown in FIG. 1, the memory 111, the processor 112, and the communication module 118 can be connected and/or electrically coupled. As such, signals can be sent between the memory 111, the processor 112 and the communication module 118. The host device 110 can also include and/or can otherwise be operably coupled to a database 120 configured to store authentication data, user profiles, resource vulnerabilities, known threats, and/or the like.

The memory 111 can be, for example, RAM, a memory buffer, a hard drive, a database, a ROM, an EPROM, an EEPROM, and/or so forth. In some instances, the memory 111 of the host device 110 includes a set of instructions or code used to perform one or more authentication actions and/or used to communicate (e.g., send and/or receive) authentication data with at least one device (e.g., the client device 130 and the resource 140) using one or more suitable communication modes. The processor 112 can be any suitable processor such as, for example, a general purpose processor, a CPU, an APU, a network processor, a front end processor, an ASIC, an FPGA, and/or the like. Thus, the processor 112 can be configured to perform and/or execute a set of instructions, modules, and/or code stored in the memory 111. For example, the processor 112 can be configured to execute a set of instructions and/or modules associated with, inter alia, receiving an authentication request (e.g., from a user of the resource 140), analyzing the authentication data, and based on the analysis of the authentication data, approving or rejecting the authentication request, as further described herein. The communication module 118 can be any suitable device that can place the host device 110 in communication with the electronic device 130 and/or the resource 140. In some embodiments, the communication module 118 can include one or more wired and/or wireless interfaces, such as, for example, Ethernet interfaces, optical carrier (OC) interfaces, asynchronous transfer mode (ATM) interfaces, and/or wireless interfaces (e.g., a WiFi® radio, a Bluetooth® radio, an NFC radio, and/or the like). Thus, the host device 110 can receive authentication data from and/or send authentication data to the client device 130 and/or the resource 140 via the communication module 118 and the communication module (not shown in FIG. 1) of the client device 130 and/or a communication module (not shown in FIG. 1) of the resource 140.

The database 120 associated with the host device 110 can be any suitable database such as, for example, a relational database, an object database, an object-relational database, a hierarchical database, a network database, an entity-relationship database, a structured query language (SQL) database, an extensible markup language (XML) database, and/or the like. In some embodiments, the database 120 can be stored in the memory 111 of the host device 110. In other embodiments, the database 120 can be operably coupled to the host device 110 via a cable, a bus, a server rack, and/or the like. In some embodiments, the host device 110 can be in communication with the database 120 over any suitable network (e.g., the network 105) via the communication module 118. In such embodiments, the database 120 can be included in or stored by a network attached storage (NAS) device. In such embodiments, the NAS device and/or the database 120 can communicate with the host device 110 over the network 105 and/or any other network(s).

The database 120 can store and/or at least temporarily retain data associated with the threat-based authentication system 100. For example, in some instances, the database 120 can store data associated with and/or otherwise representing user profiles, resource lists, authentication modes or methods, resource vulnerabilities, known threats (e.g., local threats, remote threats, and/or the like, as described above), and/or the like. In some embodiments, the database 120 can be and/or can include a relational database, in which data can be stored, for example, in tables, matrices, vectors, etc. according to the relational model. By way of example, in some instances, the host device 110 can be configured to store in the database 120 a risk mitigation table, defining one or more relationships between a set of authentication modes or methods and a set of threats, and a resource vulnerability table, defining one or more relationships between the set of threats and a set of resources. In some instances, the risk mitigation table and the resource vulnerability table can collectively define an authentication policy or the like, as described in further detail herein.

Although the host device 110 is shown and described with reference to FIG. 1 as including and/or otherwise being operably coupled to the database 120 (i.e., a single database), in some embodiments, the host device 110 can be operably coupled to any number of databases. Such databases can be configured to store at least a portion of an authentication data set associated with the system 100. For example, in some embodiments, the host device 110 can be operably coupled to and/or otherwise in communication with a database that is stored in or on the client device 130 and/or the resource 140. In this manner, the host device 110 and, in some instances, the database 120 can be in communication with any number of databases that can be physically disposed in a different location than the host device 110, while being in communication with the host device 110 (e.g., via the network 105).

Figure 2:
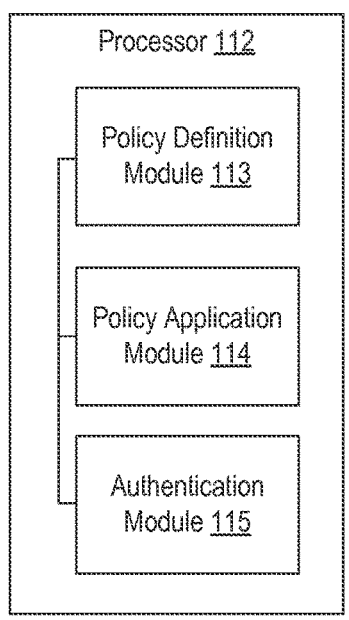
FIG. 2 is a schematic illustration of a processor of a host device included in the authentication system of FIG. 1.

As described above, the processor 112 of the host device 110 can include and/or can execute specific modules. The modules can be, for example, hardware modules, software modules stored in the memory 111 and executed in the processor 112, and/or any combination thereof. For example, as shown in FIG. 2, the processor 112 includes and/or executes a policy definition module 113, a policy application module 114 and an authentication module 115. As shown in FIG. 2, the policy definition module 113, the policy application module 114 and the authentication module 115 can be connected and/or electrically coupled. As such, signals can be sent between the policy definition module 113, the policy application module 114 and the authentication module 115.

While shown and described with respect to FIG. 1 as all being within host device 110, in other embodiments, the policy definition module 113, the policy application module 114 and/or the authentication module 115 can be within separate devices. For example, in some embodiments, the policy definition module 113 and the policy application module 114 can be within host device 110 and the authentication module 115 can be within a separate device operatively coupled to the host device 110 via a network (e.g., network 105). In such an example, the authentication module 115 can be an authentication module of a third-party identity provider and can communicate authentication information to the policy definition module 113 and/or the policy application module 114 via the network 105. For another example, in other embodiments, the policy definition module 113, the policy application module 114 and the authentication module 115 are each within a separate device operative coupled together via a network (e.g., network 105).

The policy definition module 113 includes a set of instructions that can be executed by the processor (or portion thereof) that are associated with defining an authentication policy and/or the like. For example, the policy definition module 113 can receive a signal indicative of an instruction to define a risk mitigation table 155 and a resource vulnerability table 165 (see e.g., FIG. 3), which in turn, can be stored in the database 120. In some instances, at least a portion of the risk mitigation table 155 and/or the resource vulnerability table 165 can be predetermined, predefined, and/or otherwise user-defined (e.g., defined by a user with administrator privileges or the like). As described above, the risk mitigation table 155 can define one or more relationships between the set of authentication modes (shown in FIG. 3 as "AuthN modes") and the set of threats and/or threat categories. The set of threats and/or threat categories) can be and/or can include, for example, a local threat, a remote threat, a threat associated with lost or stolen credentials, a session hijacking threat, and/or the like. In some instances, the set of threats can include any of the threats defined above and/or any other threat not explicitly defined.

The authentication modes can be any suitable mode(s) and/or method(s). In some instances, an authentication mode can be active, where a user (e.g., the user of the client device 130) actively performs an authentication action such as, for example, inputting a password or one-time password, tracing a pattern on a touch sensitive device, uttering a voice command, answering an authentication question, presenting a portion of his or her body for a biometric scan (e.g., a fingerprint scan, a retina scan, etc.), and/or the like. In other instances, an authentication mode can be passive, where a user is not actively performing an authentication action such as, for example, collecting and/or sampling data from a geolocation identifier (e.g., a global positioning system (GPS) identifier), an internet protocol (IP) address, a hard token, a session cookie, a software version, a proximity sensor, a transaction, a biometric scan, or historical data of a user.

In some instance, a user and/or an administrator can input identifiers associated with and/or representing the set of threats and identifiers associated with and/or representing the set of authentication modes (e.g., each are user-defined). In addition, a relationship between each authentication mode and each threat can define and/or can be associated with, for example, a risk mitigation score. In other words, the risk mitigation table 155 includes a set of risk mitigation scores ("M11," "M12," . . . "M65," in FIG. 3), each of which is uniquely associated with one authentication mode and one threat. For example, as shown in FIG. 3, a first authentication mode and a first threat can be associated with a first risk mitigation score M11. Each risk mitigation score is associated with and/or represents a mitigation strength for the corresponding authentication mode relative to the corresponding threat. In other words, a mitigation strength can be dependent on the method of authentication. For example, in some instances, an active authentication mode (e.g., a password) can have a greater mitigation strength than a passive authentication mode (e.g., an IP address). In some instances, a mitigation strength of a first passive authentication mode such as an IP address can be greater than a mitigation strength of a second passive authentication mode such as geolocation. In some instances, a first authentication mode can have a mitigation strength greater than a mitigation strength of a second authentication mode relative to a first threat, and the first authentication mode can have a mitigation strength less than a mitigation strength of the second authentication mode relative to a second threat, different from the first threat. Similarly stated, the risk mitigation score can indicate to what degree an authentication mode reduces and/or mitigates the probability of success of an attack from a particular threat. A risk mitigation score can be a numerical value or a percentage, where a greater numerical value or percentage is associated with a stronger mitigation towards the corresponding threat. In other instances, a risk mitigation score can be represented in any suitable manner.

In some instances, the risk mitigation score can be a numerical value assigned by a user prior to being used. In other instances, the risk mitigation score can be calculated at runtime based on a function defined by a user and/or an administrator. In such instances, the risk mitigation score can vary based on factors specific to the client device 130, resource 140, type of access, type of threat and/or the like at the time of attempted access of the resource 140 by the client device 130. For example, a function used to calculate the risk mitigation score for a specific authentication mode and threat can be based on the time of the access. In such an example, a risk mitigation score for a location-based authentication mode (e.g., within a company premise) may be greater during business hours than during non-business hours. In other instances, a function used to calculate a risk mitigation score at runtime can be based on any other factors sampled at runtime such as time, location of the client device 130, an access level of the user, a transaction value meeting a criterion (e.g., a dollar amount above a threshold), environmental factors, current load and/or available capacity of the resource 140 and/or the like.

As described above, the resource vulnerability table 165 can define one or more relationships between the set of threats and the set of resources. The set of resources can include any suitable number and/or type of resources. For example, the set of resources can include any number of electronic devices or client devices such as, for example, PCs, laptops, convertible laptops, tablets, PDAs, smart phones, wearable electronic devices (e.g., a smart watch, etc.), and/or the like. In some instances, the set of resources can include any suitable device, network, network location, server, website, access point, and/or the like. Moreover, the set of resources includes the resource 140 (FIG. 1). In some instances, a user and/or an administrator can input identifiers associated with and/or representing the set of resources (e.g., each are user-defined). In addition, a relationship between each threat and each resource can define and/or can be associated with, for example, a resource vulnerability score. In other words, the resource vulnerability table 165 includes a set of resource vulnerability scores ("R11," "R12," . . . "R55," in FIG. 3), each of which is uniquely associated with one threat and one resource. As shown in FIG. 3, a first threat and a first resource (e.g., the resource 140) can be associated with a first resource vulnerability score R11. Each resource vulnerability score is associated with and/or represents a level of vulnerability of the corresponding resource relative to the corresponding threat, as described in further detail herein. Similarly stated, the resource vulnerability score can indicate how vulnerable the resource is to a particular threat. For example, an on-premises database only accessible behind a firewall is generally less vulnerable to a man-in-the-middle (MITM) attack than a cloud-bases software-as-a-service (SaaS) offering. In some instances, a resource vulnerability score can be a numerical value or a percentage, where a greater numerical value or percentage is associated with a lower amount of vulnerability towards the corresponding threat. In other instances, a resource vulnerability score can be represented in any suitable manner.

In some instances, the resource vulnerability score can be a numerical value assigned by a user prior to being used. In other instances, the resource vulnerability score can be calculated at runtime based on a function defined by a user and/or administrator. In such instances, the resource vulnerability score can vary based on factors specific to the client device 130, resource 140, type of access, type of threat and/or the like. For example, a function used to calculate the resource vulnerability score for a specific resource and threat can be based on the time of access. In such an example, a resource vulnerability score for a local threat (e.g., within a company premise) may be greater during non-business hours than during business hours. In other instances, a function used to calculate a resource vulnerability score at runtime can be based on any other factors sampled at runtime such as time, location of the client device 130, an access level of the user, a transaction value meeting a criterion (e.g., a dollar amount above a threshold), environmental factors, current load and/or available capacity of the resource 140 and/or the like.

The policy definition module 113 can also define a set of resource confidence thresholds each of which is uniquely associated with a resource from the set of resources. Moreover, the resource confidence thresholds can collectively define a resource confidence threshold vector 175 (see e.g., FIG. 4), as described in further detail herein.

In some instances, the policy definition module 113 can be configured to define and store in the database 120 a set of user profiles for each user and/or person associated with the resource 140 and/or the set of resources. In some instances, the user profile can include identifying information such as, for example, name, address, telephone number, picture, associated devices (e.g., a media access control (MAC) address for each device), biometric data, knowledge-based questions and answers, access privileges, authentication history data, etc. Although not shown in FIG. 2, in other embodiments, the processor 112 can include a module or the like configured to define the set of user profiles (e.g., a profile module or the like). Similarly, while the policy definition module 113 is described above as being configured to store the authentication policy in the database, in other embodiments, the policy definition module 113 can be in communication with, for example, a database module or the like (e.g., executed by processor 112 and/or at database 120) that is configured to store data in the database 120, query the database 120, update data stored in the database 120, etc.

The authentication module 115 includes a set of instructions that can be executed by the processor (or portion thereof) and associated with verifying and/or evaluating authentication requests and/or data. By way of example, in some instances, the authentication module 115 can receive a signal indicative of an authentication request from the client device 130 to access, for example, the resource 140 and can verify and/or authenticate the information provided by the client device 130. In this example, the client device 130 can be an electronic device such as, for example, a smart phone. The resource 140 can be a network location (e.g., in the network 105 of FIG. 1), a portion of the Internet, access to a website, a physical location, and/or one or more applications and/or data stored, for example, in the memory of the client device 130. The authentication request can include data representing at least a resource from the set of resources to be accessed (i.e., the resource 140), information and/or data associated with one or more authentication modes, user profile information, and/or the like.

The authentication modes can be any suitable authentication mode(s) and/or method(s). In some instances, an authentication mode can be active, where a user (e.g., the user of the client device 130) actively performs an authentication action such as, for example, inputting a password or one-time password, tracing a pattern on a touch sensitive device, uttering a voice command, answering an authentication question, presenting a portion of his or her body for a biometric scan (e.g., a fingerprint scan, a retina scan, etc.), and/or the like. In other instances, an authentication mode can be passive, where a user is not actively performing an authentication action such as, for example, collecting and/or sampling data from a geolocation identifier (e.g., a global positioning system (GPS) identifier), an internet protocol (IP) address, a hard token, a session cookie, a software version, a proximity sensor, a transaction, a biometric scan, or historical data of a user.

The one or more authentication modes included in the authentication request each can be associated with a value. The authentication module 115 can verify and/or authenticate the client device 130 based on the value and the information stored in a database (e.g., database 120 or a separate database). For example, if the authentication module 115 receives a username and/or password from the client device 130, the authentication module 115 can verify that the username and/or password are correct, valid and/or match. For another example, if the authentication module 115 receives biometric authentication data, the authentication module 115 can verify that the biometric authentication data is valid and/or associated with an identifier of a the client device 130. For yet another example, the authentication module 115 can receive and verify an identifier of a location of the client device 130.

Figure 4:
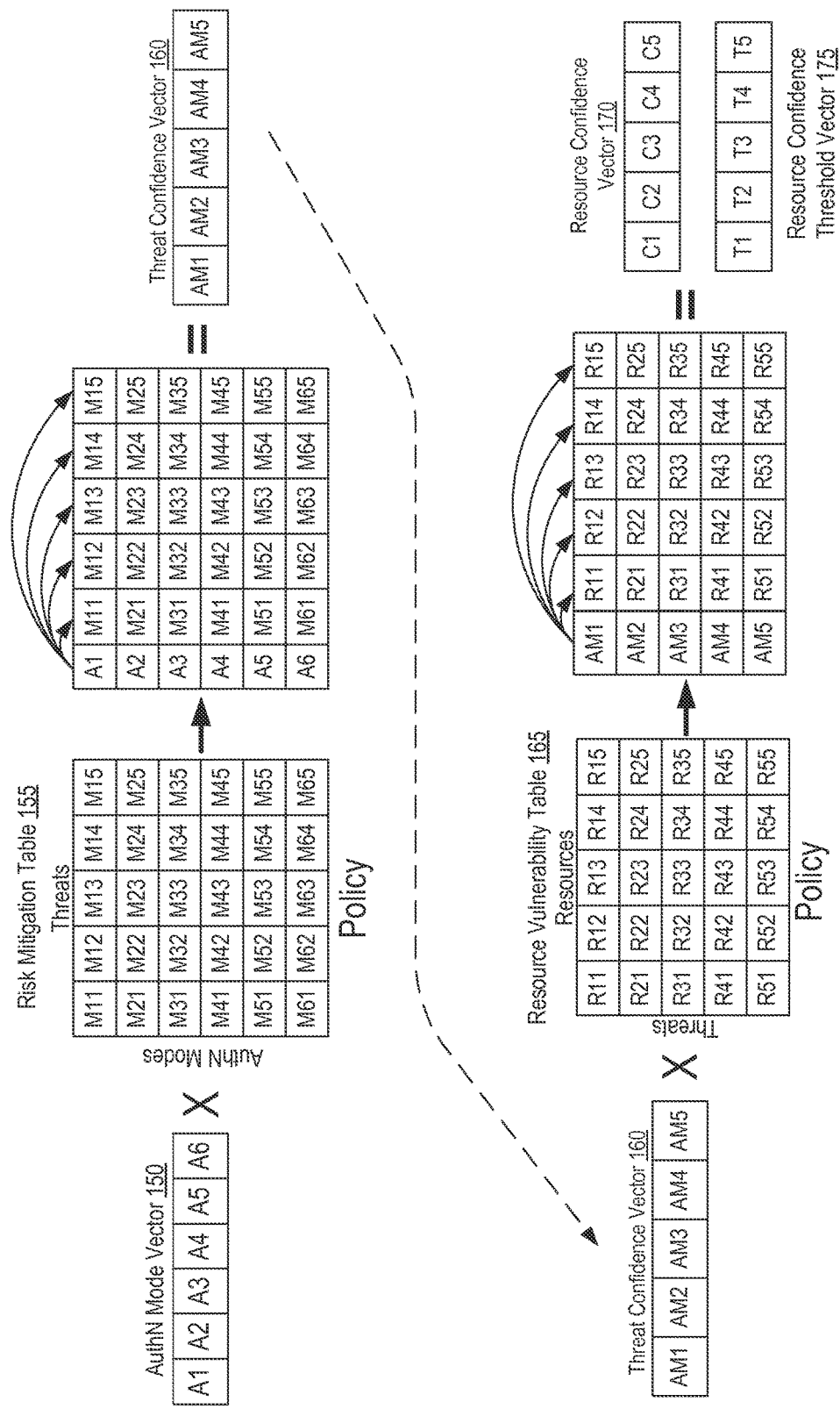
FIG. 4 is an illustration of an example of a process executed in the processor of FIG. 2 for determining a resource confidence vector.

In some embodiments, the authentication module 115 can provide to the policy application module 114 an indication of the types of authentication modes verified and/or used to authenticate the client device 130. Based on this information, the policy application module 114 can define an authentication mode vector 150, as shown in FIG. 4. The authentication mode vector 150 includes a set of authentication mode values ("A1," "A2," . . . "A6" in FIG. 4) associated with each authentication mode. In some instances, the values can be, for example, binary. For example, if valid data representing a first authentication mode is included in the authentication request from the client device 130, then a value associated with the first authentication mode can be, for example, "1" and if data representing a second authentication mode is not included in the authentication request and/or if the data representing the second authentication mode is not valid data (e.g., incorrect password), then a value associated with the second authentication mode can be, for example, "0." In other embodiments, a value associated with an authentication mode can be any suitable value such as, for example, any suitable number or fraction of a number. Moreover, the authentication mode vector 150 can include a value associated with each authentication mode from the set of authentication modes included in, for example, the risk mitigation table 155.

In other embodiments, the authentication module 115 can define and send the authentication mode vector 150 to the policy application module 114. In still other embodiments, the authentication module 115 can differentiate between invalid authentication data received from the client device 130 and data not requested. For example, if the client device 130 sends an invalid password to the authentication module 115, the authentication module 115 can indicate to the client device 130 and/or the policy application module 140 that an invalid password was provided and the client device should not be granted access to the resource. If, however, a password was not request or required, the authentication module 115 can provide an indication of such to the policy application module 114. The policy application module 114 can treat this differently than an incorrect password and can allow access of the client device 130 to the resource if the values associated with the other authentication modes satisfy the policy.

With the authentication mode vector 150 defined and the risk mitigation table 155 defined (e.g., by the policy definition module 113), the policy application module 114 can be configured to define and/or calculate a threat confidence vector 160. The threat confidence vector 160 includes a set of confidence values associated with each threat relative to the set of authentication modes. More particularly, as shown in FIG. 4, the threat confidence vector 160 can include a set of threat confidence values ("AM1," "AM2," ... "AM5" in FIG. 4) resulting from the dot product of the authentication mode vector 150 and the risk mitigation table 155. Thus, each threat confidence value ("AM1," "AM2," ... "AM5") is equal to the sum of the products between each authentication mode value ("A1," "A2," ... "A6") and a corresponding risk mitigation score ("M11," "M12," ... "M65") associated with each threat. For example, a first threat confidence value AM1 included in the threat confidence vector 160 is associated with a first threat and the risk mitigation scores of each authentication mode for the first threat are represented in the first column of the risk mitigation table 155 (i.e., "M11," "M21," "M31," "M41," "M51," and "M61"). Each authentication mode value (i.e., "A1," "A2," "A3," "A4," "A5," "A6") of the authentication mode vector 150 is multiplied by the corresponding risk mitigation score for the first threat (e.g., "A1"ב"M11," "A2"ב"M21," etc.) and subsequently summed to define, calculate, and/or otherwise determine the first threat confidence value "AM1." For another example, a second threat confidence value AM2 included in the threat confidence vector 160 is associated with a second threat and the risk mitigation scores of each authentication mode for the second threat are represented in the second column of the risk mitigation table 155 (i.e., "M12," "M22," "M32," "M42," "M52," and "M62"). Each authentication mode value (i.e., "A1," "A2," "A3," "A4," "A5," "A6") of the authentication mode vector 150 is multiplied by the corresponding risk mitigation score for the second threat (e.g., "A1"ב"M12," "A2"ב"M22," etc.) and subsequently summed to define, calculate, and/or otherwise determine the first threat confidence value "AM2." The remaining threat confidence values AM3, AM4 and AM5 can be similarly defined.

In instances in which the authentication mode values are binary (i.e., "1" if included in the authentication request or "0" if not included in the authentication request), each threat confidence value results from, for example, the sum of the risk mitigation scores corresponding to (1) that threat and (2) the authentication mode values associated with the authentication modes included in the authentication request (i.e., the authentication mode values equal to "1"). Therefore, each threat confidence value included in the threat confidence vector 160 can represent a mitigation strength of the authentication modes included in the authentication request relative to that threat.

With the threat confidence vector 160 defined and the resource vulnerability table 165 defined (e.g., by the policy definition module 113), the policy application module 114 can be configured to define and/or calculate a resource confidence vector 170. The resource confidence vector 170 includes a set of confidence values associated with each threat relative to the set of authentication modes. More particularly, as shown in FIG. 4, the resource confidence vector 170 can include a set of resource confidence values ("C1," "C2," ... "C5" in FIG. 4) resulting from the dot product of the threat confidence vector 160 and the resource vulnerability table 165. Thus, each resource confidence value ("C1," "C2," ... "C5") is equal to the sum of the products between each threat confidence value ("AM1," "AM2," ... "AM5") and a corresponding resource vulnerability score ("R11," "R12," ... "R55") associated with each resource. For example, a first threat confidence value C1 included in the resource confidence vector 170 is equal to the sum of the products between each resource vulnerability score (i.e., "R11," "R21," "R31," "R41," and "R51,") for a first resource (e.g., the resource 140) relative to each threat and the corresponding threat confidence value of the threat confidence vector 160, as described in detail above.

Each resource confidence value included in the resource confidence vector 170 can represent a degree of confidence associated with the authentication modes included in the authentication request to access the resource (e.g., the resource 140) to mitigate the effects of and/or prevent the threats from affecting that resource. In some instances, each resource confidence value can be a percentage. In other instances, each resource confidence value can be numerical. While each resource confidence value can be a fraction of a whole number (i.e., of one), the resource confidence values need not represent a percentage. That is to say, a resource confidence value does not need to correspond to a percentage value associated with a confidence for a set of authentication modes to prevent a threat to a given resource. Moreover, with the resource confidence vector 170 defined, the policy application module 114 can execute a set of instructions or code to cause the processor to compare each resource confidence value to a corresponding resource confidence threshold (i.e., "T1," "T2," "T3," "T4," or "T5") included in the resource confidence threshold vector 175 defined by the policy definition module 113. More particularly, in some instances, the resource confidence thresholds can be defined by an administrator or the like and can define and/or establish a threshold or criterion to be satisfied to positively verify an authentication request. Thus, if the resource confidence value satisfies a criterion (e.g., exceeds the corresponding resource confidence threshold), the policy application module 114 can define a positive verification associated with the authentication request (i.e., from the client device 130) and can send a signal associated with the positive verification to, for example, the communication module 118. In turn, the communication module 118 can send a signal to the client device 130 and/or the resource 140 indicative of an instruction to allow the client device 130 (and hence, the user thereof) to access the resource 140 based on the positive verification. In some embodiments, the policy application module 114 grants the client device 130 access to the resource 140.

Figure 5:
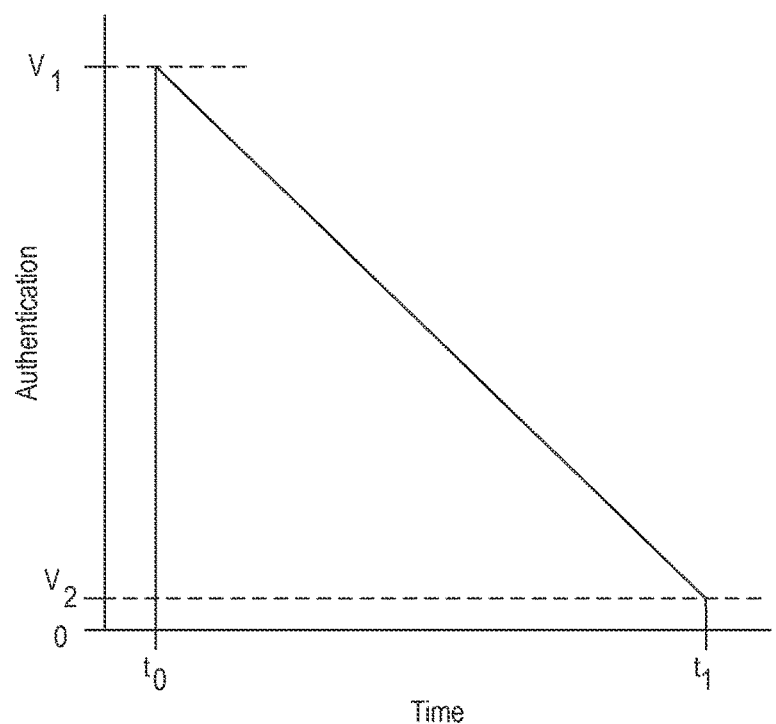
FIGS. 5 and 6 are graphs illustrating an authentication status over a period of time, according to an embodiment.

In some instances, a resource confidence value (e.g., associated with the resource 140) can lose its value over a period of time after the client device 130 has been positively verified (i.e., granted access). For example, as shown in the graph in FIG. 5, at time $t_0$ a resource confidence value can be sufficient to authenticate, for example, the client device 130. The resource confidence value, however, can decrease from a first value $V_1$ at the time $t_0$ to a second value $V_2$ at a time $t_1$. In some instances, the second value $V_2$ is such that an authentication associated with the client device 130 is no longer valid and as such, access, for example, to the resource 140 can be denied. As such, in some instances, an authentication action can be performed to again authenticate the client device 130 and/or the user of the client device 130. In some instances, such an authentication action may include the user providing multiple active authentication modes, which can be an inconvenience. Therefore, in some instances, the policy application module 114 and/or the authentication module 115 can be configured to send, via the communication module 118, a request for authentication data from the client device 130 prior to access by the client device 130 being denied. For example, in some instances, at time $t_0$ a resource confidence value can be sufficient to authenticate the client device 130. As described above with reference to FIG. 5, the resource confidence value, however, can decrease from the first value $V_1$ at the time $t_0$ to the second value $V_2$ at a time $t_1$. Decreasing the resource confidence value over time and requesting a user to reauthenticate after a predetermined time period increases the security of the resource. The authentication modes used for such reauthentication can be selected based on the specific resource, the threats most likely to occur at that resource, the effectiveness of the authentication modes to mitigate such threats, the amount of time since last authentication, and/or the like. This increases the security to mitigate the most relevant threats while reducing the burden on the user.

Figure 6:
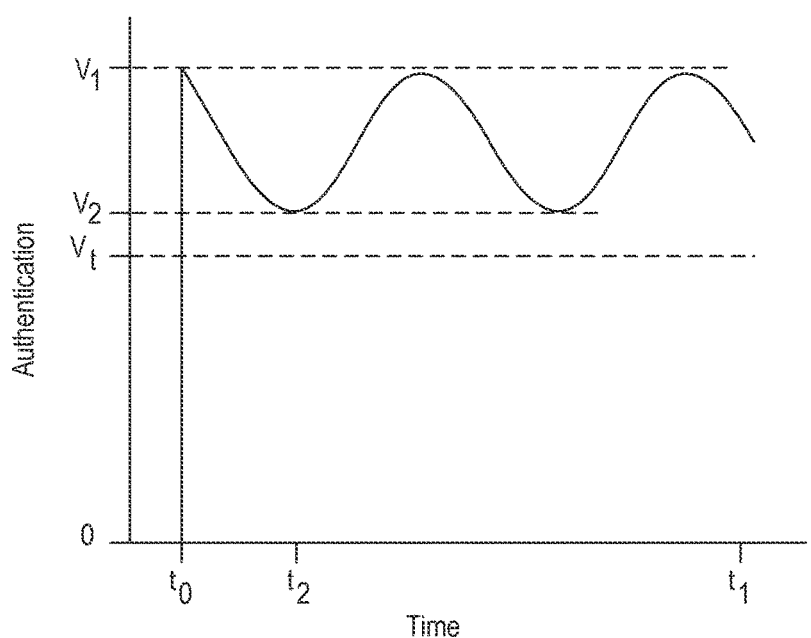

As shown in FIG. 6, in some embodiments, the policy definition module 113 and/or the policy application module 114 can define a threshold value $V_t$. The decrease in the resource confidence value can be such that at time $t_2$, the resource confidence value can, for example, satisfy a criterion and as such, the policy application module 114 and/or the authentication module 115 can send a signal to the client device 130 (e.g., via the communication module 118) associated with a request for authentication data. Thus, in response, the client device 130 can define authentication data that can include one or more authentication modes (e.g., an active authentication mode such as a password, biometric scan, and/or like, a passive authentication mode such as an IP address, geolocation, MAC address, and/or the like, or a combination thereof) and can send a signal including the authentication data to the host device 110 (e.g., via the communication module 118). As such, the client device 130 can be re-authenticated (e.g., by the authentication module 115 and the policy application module 114) without the authentication being denied. In some instances, not being denied authentication can result in a reduction of a threat confidence value (e.g., included in the threat confidence vector 160) and/or criterion that is met to re-authenticate. In other words, re-authentication of the client device 130 can, in some instances, be such that a resource confidence value at $t_2$ is less than the resource confidence value at $t_0$ while still being sufficient to re-authenticate.

In some embodiments, the policy application module 114 can be adaptive. For example, in some instances, the authentication data sent from the client device 130 to the authentication module 115 in response to the request for authentication data can be such that an updated resource confidence value exceeds a threshold. As such, the policy application module 114 can be configured to reduce the number of authentication modes requested, request passive authentication modes rather than active authentication modes, and/or the like. In some instances, the policy application module 114 can adapt to a client device 130 and/or a user's behavior relative to the client device 130 such that the client device 130 sends authentication data including one or more passive authentication modes without an active authentication mode. Thus, the client device 130 and/or a user of the client device 130 can remain authenticated without an active authentication mode. This increases the security to mitigate the most relevant threats while reducing the burden on the user.

Figure 7:
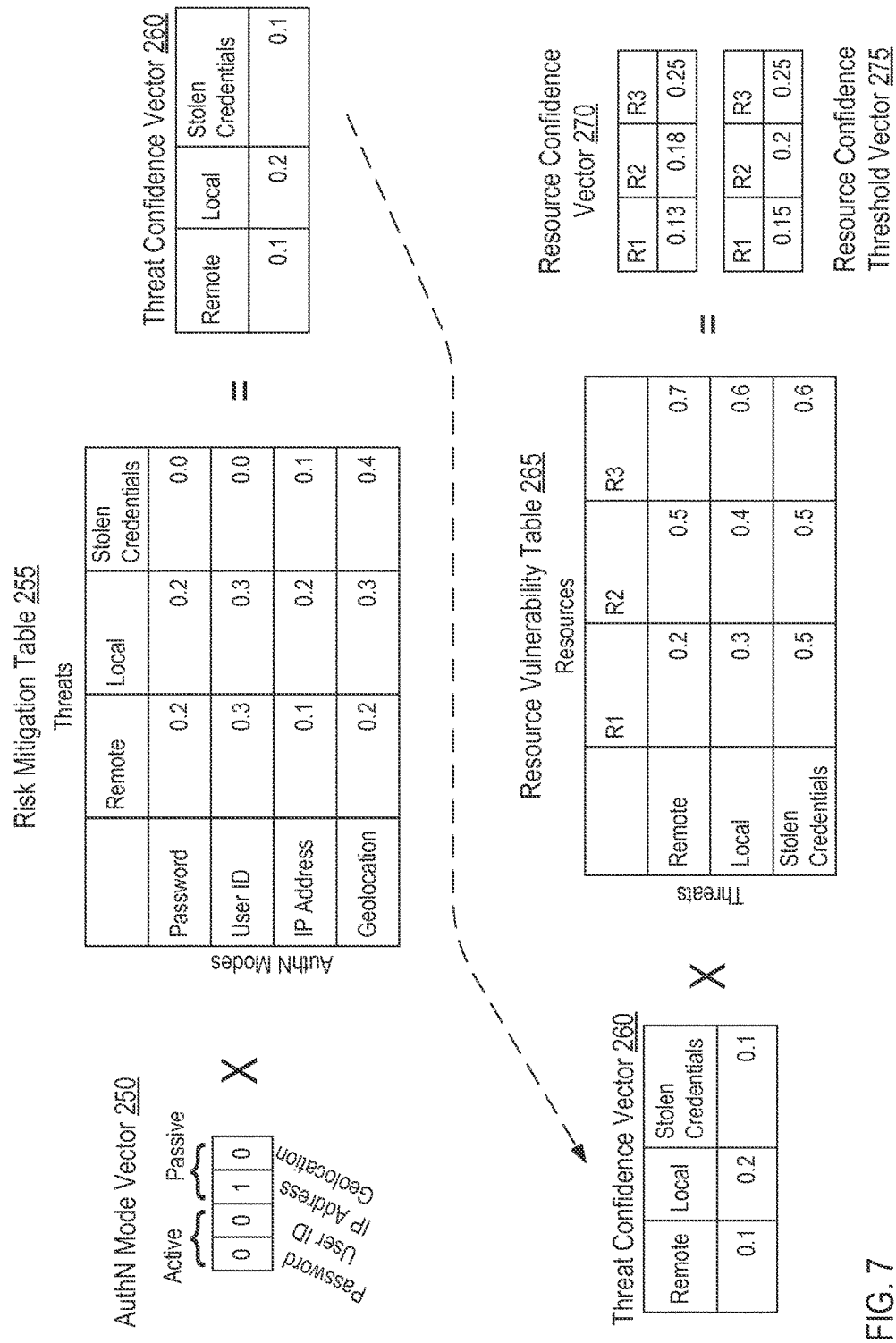

FIG. 7 is an example of an authentication process using the system 100. As shown, the policy definition module 113 can receive a signal (e.g., a user input or the like) indicative of an instruction to define a risk mitigation table 255 and a resource vulnerability table 265. As described above, the risk mitigation table 255 defines one or more relationships between a set of authentication modes and a set of threats. More specifically, the authentication modes include two active authentication modes, namely, a "Password" and a "user ID" and two passive authentication modes, namely, "IP Address" and "Geolocation." The set of threats includes a "Remote" threat (e.g., such as any of those described above), a "Local" threat (e.g., such as any of those described above), and a "Stolen Credentials" threat.

In some instance, a user and/or an administrator can input the identifiers for the set of threats and identifiers for the set of authentication modes (e.g., each are user-defined). In addition, a relationship between each authentication mode and each threat can define and/or can be associated with, for example, a risk mitigation score. In other words, the risk mitigation table 255 includes and/or defines a set of risk mitigation scores. Specifically as shown, the authentication mode "Password" has risk mitigation scores of "0.2" associated with the "Remote" threat, "0.2" associated with the "Local" threat, and "0.0" associated with the "Stolen Credentials" threat; the authentication mode "User ID" has risk mitigation scores of "0.3" associated with the "Remote" threat, "0.3" associated with the "Local" threat, and "0.0" associated with the "Stolen Credentials" threat; the authentication mode "IP Address" has risk mitigation scores of "0.1" associated with the "Remote" threat, "0.2" associated with the "Local" threat, and "0.1" associated with the "Stolen Credentials" threat; and the authentication mode "Geolocation" has risk mitigation scores of "0.2" associated with the "Remote" threat, "0.3" associated with the "Local" threat, and "0.4" associated with the "Stolen Credentials" threat. Expanding further, in some instances, a larger risk mitigation score can be associated with a greater mitigation strength relative to the corresponding threat. For example, the "Password" authentication mode can have substantially the same mitigation strength from the "Remote" threat and the "Local" threat, yet substantially does not provide mitigation relative to the "Stolen Credentials" threat. Associating the authentication modes with specific threats increases the security of devices for most-relevant threats, while reducing the burden on users for irrelevant and/or unlikely threats.

The resource vulnerability table 265 defines one or more relationships between a set of resources and the set of threats. As shown in FIG. 7, the set of resources includes a first resource "R1," a second resource "R2," and a third resource "R3." The resources "R1," "R2," and "R3," can be any suitable resource such as those described above. The relationship between each resource and each threat can define and/or can be associated with, for example, a resource vulnerability score. Specifically, the first resource "R1" has resource vulnerability scores "0.2" associated with the "Remote" threat, "0.3" associated with the "Local" threat, and "0.5" associated with the "Stolen Credentials" threat; the second resource "R2" has resource vulnerability scores "0.5" associated with the "Remote" threat, "0.4" associated with the "Local" threat, and "0.5" associated with the "Stolen Credentials" threat; and the third resource "R3" has resource vulnerability scores "0.7" associated with the "Remote" threat, "0.6" associated with the "Local" threat, and "0.6" associated with the "Stolen Credentials" threat. Expanding further, in some instances, a larger resource vulnerability score can be associated with a lower vulnerability relative to a corresponding threat. For example, a resource such as, for example, a building and/or portion of the building (or an access point operable in allowing access thereto) can have a relatively large resource vulnerability score relative to the "Remote" threat (e.g., based at least in part on the resource being a physical location), but can have a relatively small resource vulnerability relative to the "Local" threat and/or the "Stolen Credentials" threat. This emphasizes the threats with the greatest risk to the resource to increase security against that threat for the resource.

The policy definition module 113 can also define a resource confidence threshold vector 275 that includes and/or defines a set of resource confidence thresholds, each of which is uniquely associated with a resource from the set of resources. Specifically, the policy definition module 113 can define a resource confidence threshold of "0.15" for the first resource "R1," a resource confidence threshold of "0.2" for the second resource "R2," and a resource confidence threshold of "0.25" for the third resource "R3." In this manner, the resource confidence values can each define, for example, a threshold and/or criterion to be met, exceeded, and/or otherwise satisfied to define a positive authentication, as described in further detail herein.

In use, the host device 110 and more specifically, the policy application module 114 can receive a signal indicative of an authentication request from, for example, the client device 130 to access, for example, the resource 140. As described above, the policy application module 114 can be configured to approve or deny access to the resource based at least in part on the authentication policy (e.g., the risk mitigation table 255 and the resource vulnerability table 265). The authentication request can include, inter alia, data representing one or more authentication modes. In this example, the authentication request can include the "IP Address" authentication mode (e.g., the IP address of the client device 130). The one or more authentication modes included in the authentication request each can be associated with an authentication mode value and collectively define an authentication mode vector 250, as shown in FIG. 7. In some instances, the authentication mode values can be, for example, binary. Thus, in this example, the authentication mode value for "Password," "User ID," and "Geolocation" are each equal to "0," while the authentication mode value of "IP Address" is equal to "1."

With the authentication mode vector 250 defined (e.g., by the policy application module 114) and the risk mitigation table 255 defined (e.g., by the policy definition module 113), the policy application module 114 can define and/or calculate a threat confidence vector 260. The threat confidence vector 260 includes a set of threat confidence values associated with each threat relative to the set of authentication modes. Each threat confidence value included in the threat confidence vector 260 represents a mitigation strength of the authentication modes included in the authentication request relative to that threat. More particularly, the threat confidence values are the result of a dot product of the authentication mode vector 250 and the risk mitigation table 255, as described in detail above with reference to FIG. 4. Thus, the threat confidence value associated with the "Remote" threat is "0.1," the threat confidence value associated with the "Local" threat is "0.2," and the threat confidence value associated with the "Stolen Credentials" threat is "0.1."

With the threat confidence vector 260 defined (e.g., by the policy application module 114) and the resource vulnerability table 265 defined (e.g., by the policy definition module 113), the policy application module 114 can be configured to define and/or calculate a resource confidence vector 270. The resource confidence vector 270 includes a set of resource confidence values associated with each threat relative to the set of resources. As described above with reference to the threat confidence vector 260, the resource confidence values are the result of a dot product of the threat confidence vector 260 and the resource vulnerability table 265. Thus, the resource confidence value associated with the first resource "R1" is "0.13," the resource confidence value associated with the second resource "R2" is "0.18," and the resource confidence value associated with the third resource "R3" is "0.25," as shown in FIG. 7.

Each resource confidence value included in the resource confidence vector 270 represents a degree of confidence associated with an ability of the "IP Address" authentication mode to mitigate the effects of and/or prevent the "Remote" threat, the "Local" threat, and the "Stolen Credentials" threat from affecting the corresponding resource "R1," "R2," or "R3," as described in detail above. With the resource confidence vector 270 defined, the policy application module 114 can execute a set of instructions or code to cause the processor to compare each resource confidence value to a corresponding resource confidence threshold included in the resource confidence threshold vector 275 defined by the policy definition module 113 (described above). Specifically, the resource confidence value for "R1" of "0.13" is compared to the resource confidence threshold for "R1" of "0.15," the resource confidence value for "R2" of "0.18" is compared to the resource confidence threshold for "R2" of "0.2," and the resource confidence value for "R3" of "0.25" is compared to the resource confidence threshold for "R3" of "0.25."

Thus, in this example, the passive authentication mode of using, for example, the "IP Address" of the client device 130 is sufficient to allow access to the third resource "R3" but insufficient to allow access to the first resource "R1" and the second resource "R2." That is to say, in some instances, the resource confidence value associated with the third resource "R3" satisfies a criterion and as such, the policy application module 114 can define and/or verify a positive authentication. Conversely, the resource confidence values associated with the first resource "R1" and the second resource "R2" do not satisfy the corresponding criterion and as such, the authentication mode can define a negative authentication (e.g., deny authentication or the like). In response, the host device 110 can send a signal to the client device 130 and/or the third resource "R3" (e.g., the resource 140) indicative of the positive authentication. Although described above as defining the resource confidence values for each resource "R1," "R2," and "R3," in some instances, the authentication request can include data associated with the desired resource to be accessed. As such, the policy application module 114 can be configured to define a single resource confidence value associated with the desired resource to be accessed without defining resource confidence values for the remaining resources from the set of resources.

FIG. 8 is another example of an authentication process using the system 100. As shown, the policy definition module 113 can receive a signal (e.g., a user input or the like) indicative of an instruction to define a risk mitigation table 355 and a resource vulnerability table 365. As shown, the risk mitigation table 355 and the resource vulnerability table 365 are the same as the risk mitigation table 255 and the resource vulnerability table 265 shown in FIG. 7. Thus, the risk mitigation table 355 defines one or more relationships between (1) a set of authentication modes including two active authentication modes, namely, a "Password" and a "User ID" and two passive authentication modes, namely, "IP Address" and "Geolocation" and (2) a set of threats including a "Remote" threat, a "Local" threat, and a "Stolen Credentials" threat, as described above. The risk mitigation table 355 includes and/or defines a set of risk mitigation scores, as described above. Specifically as shown, the authentication mode "Password" has risk mitigation scores of "0.2" associated with the "Remote" threat, "0.2" associated with the "Local" threat, and "0.0" associated with the "Stolen Credentials" threat; the authentication mode "User ID" has risk mitigation scores of "0.3" associated with the "Remote" threat, "0.3" associated with the "Local" threat, and "0.0" associated with the "Stolen Credentials" threat; the authentication mode "IP Address" has risk mitigation scores of "0.1" associated with the "Remote" threat, "0.2" associated with the "Local" threat, and "0.1" associated with the "Stolen Credentials" threat; and the authentication mode "Geolocation" has risk mitigation scores of "0.2" associated with the "Remote" threat, "0.3" associated with the "Local" threat, and "0.4" associated with the "Stolen Credentials" threat.

The resource vulnerability table 365 defines one or more relationships between (1) a set of resources including a first resource "R1," a second resource "R2," and a third resource "R3" and (2) the set of threats. The resource vulnerability table 365 includes and/or defines a set of resource vulnerability scores, as described above. Specifically, the first resource "R1" has resource vulnerability scores "0.2" associated with the "Remote" threat, "0.3" associated with the "Local" threat, and "0.5" associated with the "Stolen Credentials" threat; the second resource "R2" has resource vulnerability scores "0.5" associated with the "Remote" threat, "0.4" associated with the "Local" threat, and "0.5" associated with the "Stolen Credentials" threat; and the third resource "R3" has resource vulnerability scores "0.7" associated with the "Remote" threat, "0.6" associated with the "Local" threat, and "0.6" associated with the "Stolen Credentials" threat. The policy definition module 113 also defines a set of resource confidence thresholds each of which is uniquely associated with a resource from the set of resources. Specifically, the policy definition module 113 can define a resource confidence threshold of "0.15" for the first resource "R1," a resource confidence threshold of "0.2" for the second resource "R2," and a resource confidence threshold of "0.25" for the third resource "R3."

The policy definition module 113 can also define a resource confidence threshold vector 375 that includes and/ or the defines a set of resource confidence thresholds, each of which is uniquely associated with a resource from the set of resources. Specifically, the policy definition module 113 can define a resource confidence threshold of "0.15" for the first resource "R1," a resource confidence threshold of "0.2" for the second resource "R2," and a resource confidence threshold of "0.25" for the third resource "R3." In this manner, the resource confidence values can each define, for example, a threshold and/or criterion to be met, exceeded, and/or otherwise satisfied to define a positive authentication, as described in further detail herein.

In use, the host device 110 and more specifically, the policy application module 114 can receive a signal indicative of an authentication request from, for example, the client device 130 to access, for example, the resource 140. As described above, the authentication request can include, among other things, data representing one or more authentication modes. The one or more authentication modes included in the authentication request each can be associated with a authentication mode value that collectively define an authentication mode vector 350. In this example, the authentication request includes data representing the active authentication mode "Password" and the passive authentication mode "IP Address." Thus, the authentication mode value for "User ID" and "Geolocation" are each equal to "0," while the authentication mode value for "Password" and "IP Address" are each equal to "1," as described in detail above. With the authentication mode vector 350 defined (e.g., by the policy application module 114) and the risk mitigation table 355 defined (e.g., by the policy definition module 113), the policy application module 114 can define and/or calculate a threat confidence vector 360. The threat confidence vector 360 includes a set of threat confidence values associated with each threat relative to the set of authentication modes, as described in detail above. Each threat confidence value included in the threat confidence vector 360 represents a mitigation strength of the authentication modes included in the authentication request relative to that threat. More particularly, the threat confidence values are the result of a dot product of the authentication mode vector 350 and the risk mitigation table 355, as described in detail above with reference to FIG. 4. Thus, the threat confidence value associated with the "Remote" threat is "0.3," the threat confidence value associated with the "Local" threat is "0.4," and the threat confidence value associated with the "Stolen Credentials" threat is "0.1."

With the threat confidence vector 360 defined (e.g., by the policy application module 114) and the resource vulnerability table 365 defined (e.g., by the policy definition module 113), the policy application module 114 can define and/or calculate a resource confidence vector 370 including a set of resource confidence values associated with each threat relative to the set of resources. As described above with reference to the threat confidence vector 360, the resource confidence values are the result of a dot product of the threat confidence vector 360 and the resource vulnerability table 365. Thus, the resource confidence value associated with the first resource "R1" is "0.23," the resource confidence value associated with the second resource "R2" is "0.36," and the resource confidence value associated with the third resource "R3" is "0.51," as shown in FIG. 8.

Each resource confidence value included in the resource confidence vector 370 represents a degree of confidence associated with an ability to mitigate the effects of and/or prevent the set of threats (i.e., "Remote," "Local," "Stolen Credentials") from affecting the corresponding resource "R1," "R2," or "R3" based on a combination of the "Password" authentication mode and the "IP Address" authentication mode. With the resource confidence vector 370 defined, the policy application module 114 can execute a set of instructions or code to cause the processor to compare each resource confidence value to a corresponding resource confidence threshold included in the resource confidence threshold vector 375 defined by the policy definition module 113 (described above). Specifically, the resource confidence value for "R1" of "0.23" is compared to the resource confidence threshold for "R1" of "0.15," the resource confidence value for "R2" of "0.36" is compared to the resource confidence threshold for "R2" of "0.2," and the resource confidence value for "R3" of "0.51" is compared to the resource confidence threshold for "R3" of "0.25." Thus, in this example, the authentication modes of using the "Password" and the "IP Address" (e.g., of the client device 130 from which the authentication request was sent) is sufficient to allow access to the each resource "R1," "R2," and "R3," as described in detail above. The addition of a second authentication mode (i.e., the "Password" authentication mode) increases the resource confidence value associated with each resource a sufficient amount to provide a positive authentication of the client device 130 (or the user thereof) for each resource. In response, the host device 110 can send a signal to the client device 130 and/or the set of resources indicative of the positive authentication. In some embodiments, such a signal and/or positive authentication can grant the client device 130 access to the set of resources.

Figure 9:
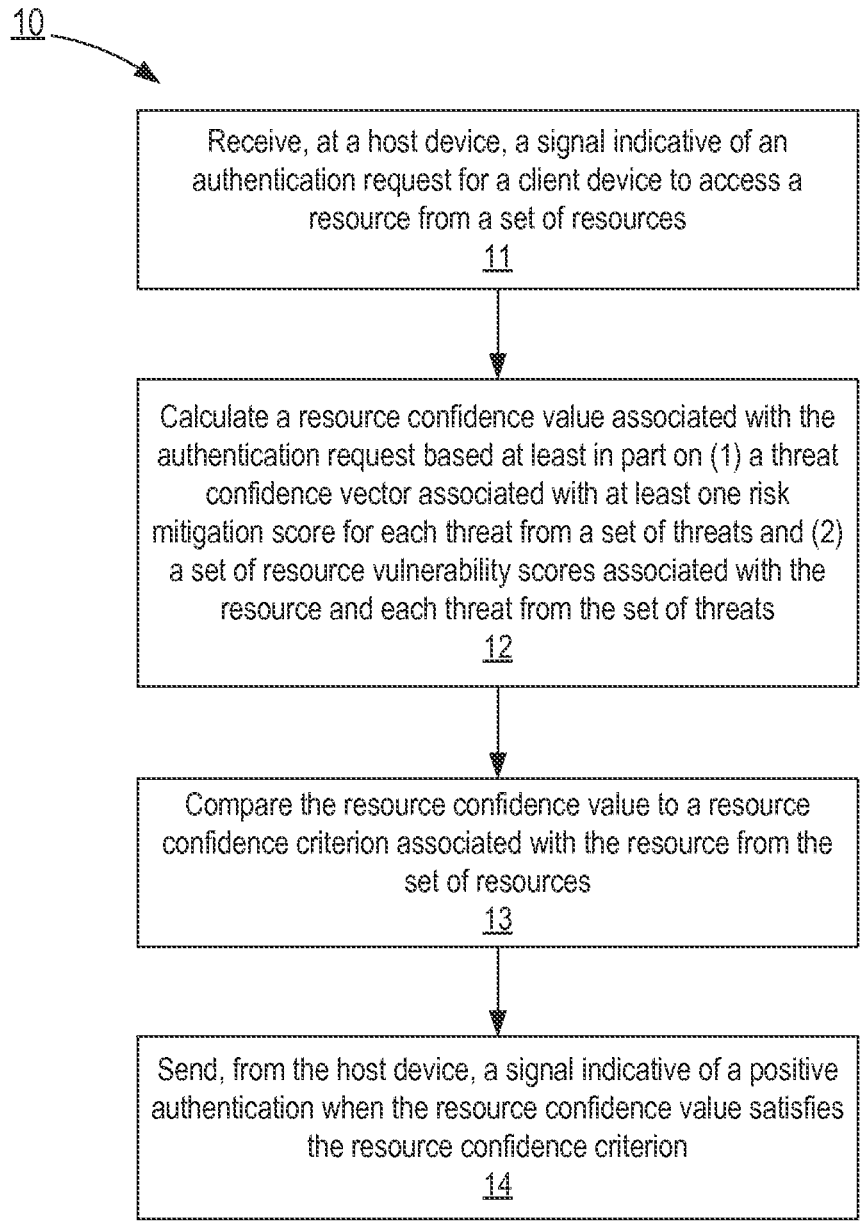
FIG. 9 is a flowchart illustrating a method of using a threat-based authentication system according to an embodiment.

FIG. 9 is a flowchart illustrating a method 10 of using a threat-based authentication system according to an embodiment. The threat-based authentication system can any suitable configuration. For example, in some embodiments, such a threat-based authentication system can be substantially similar to or the same as the system 100 described above. The method 10 includes receiving, at a host device (e.g., from a client device or an identity provider), a signal indicative of an authentication request to access a resource from a set of resources, at 11 (e.g., authentication information, an authentication mode vector, etc.). In some embodiments, the host device can be substantially similar to or the same as the host device 110 in FIGS. 1 and 2, the client device can be substantially similar to or the same as the client device 130 in FIG. 1, and the resource can be substantially similar to or the same as the resource 140 in FIG. 1. More specifically, in some embodiments, the client device can be, for example, an electronic device such as a PC, laptop, tablet, smartphone, etc. In other embodiments, the client device can be a passive device or the like such as a key fob, a key card, a card including a readable magnetic strip, and/or any other suitable credential. The resource can be, for example, an electronic device and/or a software application stored in a memory of the electronic device, a server, a group of servers, a network, a virtual network, a network location, a network device, a website, physical location or structure such as a building, portion of a building, a vault, and/or any other resource described herein. In some embodiments, the resource and the client device can be included in and/or can be the same device. The authentication request can include authentication data associated with the client device and/or a user of the client device as well as data associated with the desired resource to be accessed. For example, in some embodiments, the authentication request can include data representing one or more authentication modes and/or methods, a user profile, an resource identifier, and/or the like. As described in detail above, the one or more authentication modes can be, for example, an active authentication mode, a passive authentication mode, and/or a combination thereof.

A resource confidence value associated with the authentication request is calculated based at least in part on (1) a threat confidence vector associated with at least one risk mitigation score for each threat from the set of threats and (2) a set of resource vulnerability scores associated with the resource and each threat from the set of threats, at 12. Expanding further, the host device can include a policy definition module (e.g., the policy definition module 113) or the like that can define, for example, an authentication policy including at least a risk mitigation table, a resource vulnerability table, and a resource confidence threshold associated with each resource from the set of resources. For example, the risk mitigation table can be similar (at least in form and/or function) to the risk mitigation table 155, 255, and/or 355 and the resource vulnerability table can be similar (at least in form and/or function) to the resource vulnerability tables 165, 265, and/or 365. Thus, the risk mitigation table can include the at least one risk mitigation score for each threat and the resource vulnerability table can include the set of resource vulnerability scores associated with the resource and each threat from the set of threats, as described in detail above with reference to FIGS. 3 and 4. As described above, the resource confidence threshold (also referred to herein as resource confidence criterion) for each resource can be included in and/or can define a resource confidence threshold vector that can be similar (at least in form and/or function) to the resource confidence threshold vector 175, 275, and/or 375. In some instances, the resource confidence threshold associated with each resource from the set of resources can define a criterion or the like that is associated with a level, strength, and/or ability to mitigate the effects of and/or to prevent the set of threats from affecting each resource from the set of resources, as described in detail above with reference to FIGS. 4, 7, and 8.

As described above, the host device and/or a policy application module (e.g., the policy application module 114) can calculate the resource confidence value associated with the authentication request based on the authentication data included in the authentication request and the authentication policy (i.e., the risk mitigation table, the resource vulnerability table, and the resource confidence threshold vector). More specifically, the host device can define and/or calculate the threat confidence vector based on a dot product of the one or more authentication modes included in the authentication request and the risk mitigation table. In this manner, the threat confidence vector can include a threat confidence value for each threat from the set of threats that is associated with and/or represents a mitigation strength of the one or more authentication modes included in the authentication request relative to each threat, as described in detail above with reference to FIG. 4. Similarly, the host device can define and/or calculate the resource confidence value associated with the authentication request based on a dot product of the threat confidence vector and the resource vulnerability table. In this manner, the resource confidence value associated with the authentication request to access the resource from the set of resources is associated with and/or represents an ability to mitigate the effects of and/or substantially prevent the set of threats from affecting the resource from the set of resources based on the one or more authentication modes included in the authentication request.

Once calculated, the resource confidence value associated with the resource from the set of resources is compared to a resource confidence threshold associated with the resource from the set of resources, at 13. As described above, the resource confidence threshold can define a criterion or the like associated with a level, strength, and/or ability to mitigate the effects of and/or to prevent the set of threats from affecting the resource from the set of resources. Therefore, if the resource confidence value satisfies the criterion established and/or defined by the corresponding resource confidence threshold, the host device can define and/or can verify a positive authentication associated with the authentication request, as described in detail above with reference to FIG. 4. As such, the host device can send a signal indicative of the positive authentication (e.g., to the client device or identity provider) when the resource confidence value satisfies the resource confidence criterion, as 14. In some instances, the positive authentication of the client device is operable in allowing the client device and/or the user thereof to access the resource from the set of resources.

Figure 10:
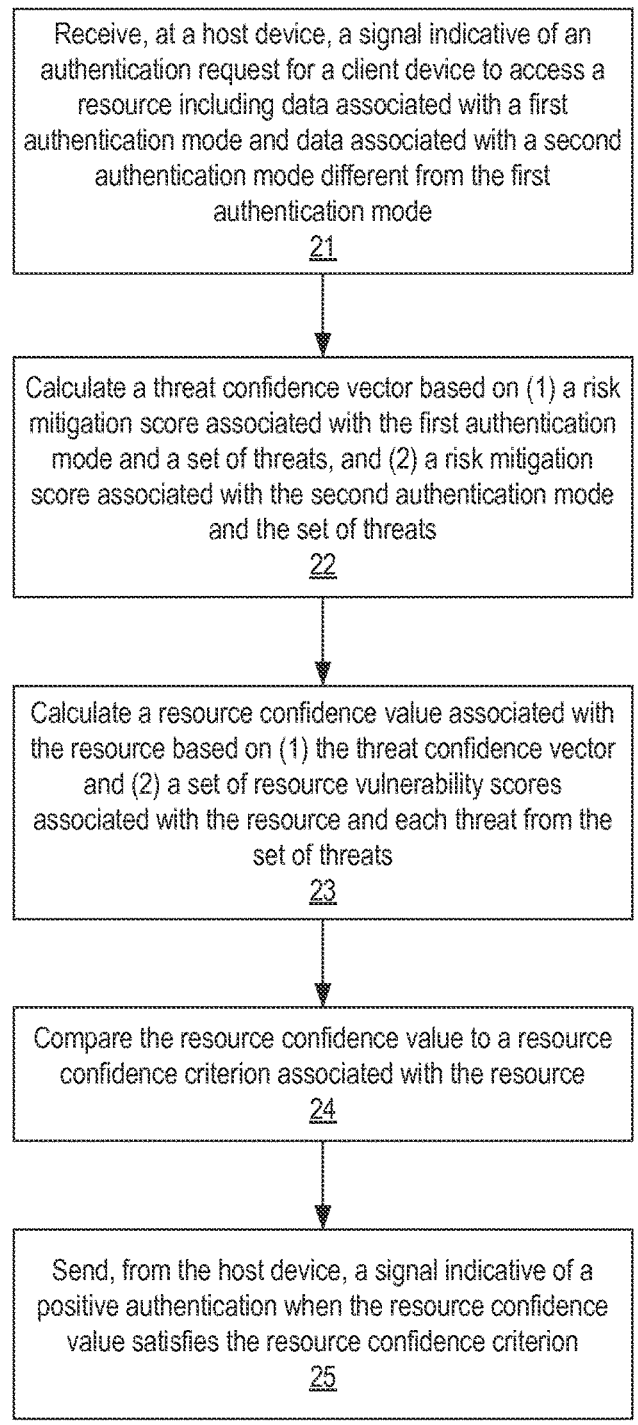
FIG. 10 is a flowchart illustrating a method of using a threat-based authentication system according to another embodiment.

FIG. 10 is a flowchart illustrating a method 20 of using a threat-based authentication system according to an embodiment. The threat-based authentication system can any suitable configuration. For example, in some embodiments, such a threat-based authentication system can be substantially similar to or the same as the system 100 described above. The method 20 includes receiving, at a host device (e.g., from the client device or identity provider), a signal indicative of an authentication request to access a resource including data associated with a first authentication mode and a second authentication mode different from the first authentication mode, at 21 (e.g., authentication information, an authentication mode vector, etc.). In some embodiments, the host device can be substantially similar to or the same as the host device 110 in FIGS. 1 and 2, the client device can be substantially similar to or the same as the client device 130 in FIG. 1, and the resource can be substantially similar to or the same as the resource 140 in FIG. 1. More specifically, in some embodiments, the client device can be, for example, an electronic device such as a PC, laptop, tablet, smartphone, etc. In other embodiments, the client device can be a passive device or the like such as a key fob, a key card, a card including a readable magnetic strip, and/or any other suitable credential. The resource can be, for example, an electronic device and/or a software application stored in a memory of the electronic device, a server, a group of servers, a network, a virtual network, a network location, a network device, a website, physical location or structure such as a building, portion of a building, a vault, and/or any other resource described herein. In some embodiments, the resource and the client device can be included in and/or can be the same device. The first authentication mode and the second authentication mode can be any suitable authentication mode such as those described herein. For example, in some instances, the first authentication mode can be, for example, an active authentication mode such as a password, input, voice command, biometric scan, and/or the like and the second authentication mode can be, for example, a passive authentication mode such as an IP address, geolocation, sensor output (e.g., from an accelerometer, gyroscope, light sensor, etc. included in or one the client device) and/or the like. In other instances, first authentication mode and the second authentication mode can each be an active authentication mode or can each be a passive authentication mode.

A threat confidence vector is calculated based on (1) a risk mitigation score associated with the first authentication mode and a set of threats, and (2) a risk mitigation score associated with the second authentication mode and the set of threats, at 22. Expanding further, the host device can include a policy definition module (e.g., the policy definition module 113) or the like that can define, for example, an authentication policy including at least a risk mitigation table, a resource vulnerability table, and a resource confidence threshold associated with each resource from the set of resources. Moreover, the host device and/or a policy application module included in therein (e.g., the policy application module 114) can be configured to define an authentication mode vector (e.g., similar to or the same as the authentication mode vector 350 in FIG. 8) including a set of authentication mode values. As described in detail above, with the authentication request including data representing the first authentication mode and the second authentication mode, the authentication mode values associated therewith can be, for example, equal to one, which in turn, indicates a presence of the data representing the first authentication mode and the second authentication mode.

The host device can define and/or calculate the threat confidence vector based on a dot product of the authentication mode vector and the risk mitigation table. In some embodiments, the risk mitigation table can be similar (at least in form and/or function) to the risk mitigation table 155, 255, and/or 355. As such, the risk mitigation table can include the risk mitigation score associated with the first authentication mode and the set of threats and the risk mitigation score associated with the second authentication mode and the set of threats, as described above with reference to FIGS. 3 and 4. The threat confidence vector resulting from the dot product of the authentication mode vector and the risk mitigation table can include a threat confidence value for each threat from the set of threats that represents a mitigation strength associated with the collective use of the first authentication mode and the second authentication mode relative to each threat from the set of threats, as described in detail above with reference to FIG. 8.

With the threat confidence vector calculated, a resource confidence value associated with the resource is calculated based on (1) the threat confidence vector and (2) a set of resource vulnerability scores associated with the resource and each threat from the set of threats, at 23. As described above, the host device and/or a policy application module included therein can calculate the resource confidence value associated with the authentication request based on a dot product of the threat confidence vector and the resource vulnerability table. More particularly, the resource vulnerability table can include the set of resource vulnerability scores associated with the resource and each threat from the set of threats, as described in detail above with reference to FIGS. 3 and 4. In some embodiments, the resource vulnerability table can be similar (at least in form and/or function) to the resource vulnerability tables 165, 265, and/or 365. In this manner, the resource confidence value associated with the authentication request to access the resource represents an ability to mitigate the effects of and/or substantially prevent the set of threats from affecting the resource based on the use of the first authentication mode and the second authentication mode.

Once calculated, the resource confidence value associated with the resource from the set of resources is compared to a resource confidence threshold associated with the resource from the set of resources, at 24. The resource confidence threshold (also referred to herein as resource confidence criterion) for the resource can define a criterion or the like that is associated with a level, strength, and/or ability to mitigate the effects of and/or to prevent the set of threats from affecting the resource, as described in detail above with reference to FIG. 8. Therefore, if the resource confidence value satisfies the criterion established and/or defined by the corresponding resource confidence threshold, the host device can define and/or can verify a positive authentication associated with the authentication request, as described in detail above with reference to FIG. 8. As such, the host device can send a signal indicative of the positive authentication (e.g., to the client device or identity provider) when the resource confidence value satisfies the resource confidence criterion, as 25. In some instances, the positive authentication of the client device is operable in allowing the client device and/or the user thereof to access the resource from the set of resources.

While various embodiments have been described above, it should be understood that they have been presented by way of example only, and not limitation. Where schematics and/or embodiments described above indicate certain components arranged in certain orientations or positions, the arrangement of components may be modified. For example, while the host device 110 is described above defining the resource confidence vector 270 based on, for example, the dot product of the authentication mode vector 150, 250, or 350 and the risk mitigation table 155, 255, or 355, respectively, and the dot product of the resulting threat confidence vector 160, 260, or 360, respectively, and the resource vulnerability table 165, 265, or 365, respectively, in other embodiments, the host device 110 can perform any suitable threat-based calculation or the like to determine a positive authentication. For example, in some embodiments, a host define can define an authentication probabilities table including a set of values associated with a probability of a set of authentication modes being affected by a set of threats (e.g., analogous to the risk mitigation table), a resource vulnerability table (e.g., such as the resource vulnerability table 165, 265, and/or 365), and a threat probabilities vector including values associated with a probability of being affected by a threat. In such embodiments, the authentication probabilities table, the resource vulnerability table, and the threat probabilities vector can be inputs into, for example, Bayes Theorem. As such, a resource confidence vector substantially similar to the resource confidence vector 170, 270, and/or 370 can be calculated and subsequently compared to a corresponding resource confidence threshold vector, as described above. In such embodiments, the use of Bayes Theorem can be such that the authentication probabilities table, the resource vulnerability table, and the threat probabilities vector are, for example, substantially independent inputs.

While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In some embodiments, a method includes receiving, at a host device, a signal indicative of an authentication request for a client device to access a resource from a set of resources. The method includes calculating a resource confidence value associated with the authentication request based at least in part on (1) a threat confidence vector associated with at least one risk mitigation score for each threat from a set of threats and (2) a set of resource vulnerability scores associated with the resource and each threat from the set of threats. The method further includes comparing the resource confidence value to a resource confidence criterion associated with the resource from the set of resources. The method includes sending, from the host device, a signal indicative of a positive authentication when the resource confidence value satisfies the resource confidence criterion.

In some embodiments the authentication request includes data associated with at least one authentication mode and the risk mitigation score represents a mitigation strength of the authentication mode as related to a threat. In some embodiments, the threat confidence vector includes a plurality of threat confidence values, each threat confidence value from the plurality of threat confidence values being uniquely associated with a threat from the set of threats.

In some embodiments, the authentication request includes data associated with at least one of (1) an active authentication mode, in which a user performs an authentication action, or (2) a passive authentication mode, in which a user substantially does not perform an authentication action. In some embodiments, the method includes sending, from the host device, a signal indicative of a failed authentication if the resource confidence value does not satisfy the resource confidence criterion.

In some embodiments, the resource confidence value decreases over a period of time after the sending of the signal indicative of the positive authentication. The method includes sending, from the host device and at a predetermined time within the period of time, a signal indicative of a request for authentication verification. The method further includes receiving, at the host device and in response to the request for authentication verification, a signal indicative of authentication data and updating the resource confidence value based on the authentication data to define an updated resource confidence value.

In some embodiments the resource confidence value decreases over a period of time after the sending of the signal indicative of the positive authentication. The method includes sending, from the host device and at a predetermined time within the period of time, a signal indicative of a request for authentication verification. The method can further include receiving, at the host device and in response to the request for authentication verification, a signal indicative of authentication data and updating the resource confidence value based on the authentication data to define an updated resource confidence value different from the resource confidence value.

In some embodiments, a method includes receiving, at a host device, a signal indicative of an authentication request for a client device to access a resource. The signal can include data associated with a first authentication mode and data associated with a second authentication mode different from the first authentication mode. The method further includes calculating a threat confidence vector based on (1) a risk mitigation score associated with the first authentication mode and a set of threats, and (2) a risk mitigation score associated with the second authentication mode and the set of threats. Moreover, the method includes calculating a resource confidence value associated with the resource, the resource confidence value based on (1) the threat confidence vector and (2) a set of resource vulnerability scores associated with the resource and each threat from the set of threats. Additionally, the method includes comparing the resource confidence value to a resource confidence criterion associated with the resource and sending, from the host device to the client device, a signal indicative of a positive authentication when the resource confidence value satisfies the resource confidence criterion.

In some embodiments, the method includes defining the resource confidence criterion for the resource based at least in part on (1) at least one risk mitigation score associated with each threat from the set of threats and (2) the set of resource vulnerability scores associated with each threat from the set of threats. In some embodiments, the first authentication mode is one of an active authentication mode or a passive authentication mode and the second authentication mode is one of an active authentication mode or a passive authentication mode.

In some embodiments, the first authentication mode uses at least one of a password, a one-time password, a keystroke, a knowledge-based authentication, a voice recognition, or a biometric scan. In some embodiments, the second authentication mode uses at least one of a geolocation identifier, an internet protocol (IP) address, a hard token, a session cookie, a software version, a proximity sensor, a transaction, a biometric scan, or historical data of a user.

In some embodiments, the resource confidence value decreases over a period of time after the sending of the signal indicative of the positive authentication. The method can further include sending, from the host device and during the period of time, a signal indicative of a request for authentication verification when the resource confidence value satisfies a criterion. Additionally, the method includes receiving, at the host device, a signal indicative of authentication data and updating the resource confidence value based on the authentication data to define an updated resource confidence value.

In some embodiments, an apparatus includes a communication module, a policy definition module and a policy application module. The communication module is implemented in at least one of a memory or a processor. The communication module is configured to electronically communicate with a client device and a set of resources. The policy definition module is configured to define a resource confidence criterion for each resource from the set of resources based on (1) a threat confidence vector associated with a set of risk mitigation scores for each threat from a set of threats and (2) a set of resource vulnerability scores for each threat from the set of threats. The policy application module is configured to (1) receive a signal via the communication module indicative of an authentication request associated with a resource from the set of resources and (2) define a resource confidence value for the resource from the set of resources based on a threat confidence vector associated with the authentication request and the set of resource vulnerability scores. The policy application module is further configured to (1) compare the resource confidence value for the resource from the set of resources and the resource confidence criterion for the resource from the set of resources and (2) send a signal via the communication module indicative of a positive authentication, when the resource confidence criterion for the resource from the set of resources is satisfied.

In some embodiments, the apparatus includes a database module operably coupled to a database. The database module is configured to store data in the database representing at least one of the set of risk mitigation scores, the set of resource vulnerability scores, the resource confidence criterion for each resource from the set of resources, or a user profile associated with a user of the client device. The policy definition module is configured to (1) define the resource confidence criterion for the resource from the set of resources based at least in part on data stored in the database and associated with the user profile and (2) send a signal to the database module indicative of an instruction to store data representing the resource confidence criterion for the resource from the set of resources in the database.

In some embodiments, the client device is a resource from the set of resources. In some embodiments, each resource from the set of resources is at least one of an electronic device, a group of electronic devices, a magnetic device, or a network device. In some embodiments, the policy application module is configured to send a signal, via the communication module, indicative of a failed authentication when the resource confidence criterion for the resource from the set of resources is not satisfied. In some embodiments, the resource confidence value is from a plurality of resource confidence values collectively defining a resource confidence vector. The resource confidence vector is based at least in part on an authentication probability matrix, a resource probability matrix, and a threat probability vector.

In some embodiments, the resource confidence value decreases over a period of time after the positive authentication of the resource from the set of resources. The policy application module is further configured to (1) send a signal indicative of a request for authentication verification when the resource confidence value decreases to a predetermined level and (2) update the resource confidence value based on authentication data received in response to the request for authentication verification.

What is claimed is:

1. An apparatus, comprising:
a memory storing instructions and a processor operably coupled via a computer network to both (1) a compute device including a set of resources and (2) a client device, the processor configured to execute the instructions to:
to define a resource confidence criterion for each resource from the set of resources based on (1) a threat confidence vector associated with a set of risk mitigation scores for each threat from a set of threats and (2) a set of resource vulnerability scores for each threat from the set of threats;
receive from the client device a signal indicative of an authentication request (1) for a resource from the set of resources and (2) including a credential associated with an authentication mode from a set of authentication modes;
define a resource confidence value for the resource requested by the client device based on a threat confidence vector associated with the authentication mode and the set of resource vulnerability scores;
compare the resource confidence value for the resource and the resource confidence criterion for the resource to determine whether the resource confidence criterion for the resource is satisfied; and
send a signal indicative of a positive authentication when the resource confidence criterion for the resource is satisfied such that the client device is granted access to the resource.

2. The apparatus of claim 1, wherein the processor is further configured to execute the instructions to:
store data representing at least one of the set of risk mitigation scores, the set of resource vulnerability scores, the resource confidence criterion for each resource from the set of resources, or a user profile associated with a user of the client device;
define the resource confidence criterion for the resource from the set of resources based at least in part on data stored and associated with the user profile; and
send a signal indicative of an instruction to store data representing the resource confidence criterion for the resource from the set of resources.

3. The apparatus of claim 1, wherein the client device is a resource from the set of resources.

4. The apparatus of claim 1, wherein each resource from the set of resources is at least one of an electronic device, a group of electronic devices, a magnetic device, or a network device.

5. The apparatus of claim 1, wherein the processor is further configured to execute the instructions to: send a signal indicative of a failed authentication when the resource confidence criterion for the resource from the set of resources is not satisfied.

6. The apparatus of claim 1, wherein the resource confidence value is from a plurality of resource confidence values collectively defining a resource confidence vector, the resource confidence vector being based at least in part on an authentication probability matrix, a resource probability matrix, and a threat probability vector.

7. The apparatus of claim 1, wherein the resource confidence value decreases over a period of time after the positive authentication of the resource from the set of resources, the processor further configured to execute the instructions to:
send a signal indicative of a request for authentication verification when the resource confidence value decreases to a predetermined level; and
update the resource confidence value based on authentication data received in response to the request for authentication verification.

8. The apparatus of claim 1, wherein the resource confidence value for the resource represents a degree of confidence associated with an ability of the authentication mode to mitigate each threat from the set of threats from affecting the resource.

9. The apparatus of claim 1, wherein the set of threats includes at least a remote threat, a local threat, and a stolen credential threat.

10. A method, comprising:
receiving, at a host device operably coupled via a computer network to both (1) a set of resources and (2) a client device, a signal indicative of an authentication request for the client device to access a resource from the set of resources, the authentication request including a credential associated with an authentication mode from a set of authentication modes;
calculating a resource confidence value associated with the authentication request based at least in part on (1) a threat confidence vector associated with at least one risk mitigation score for each threat from a set of threats and (2) a set of resource vulnerability scores associated with the resource and each threat from the set of threats, the resource confidence value representing a degree of confidence associated with an ability of the authentication mode to mitigate each threat from the set of threats from affecting the resource;
defining a resource confidence criterion for the resource based at least in part on (1) at least one risk mitigation score associated with each threat from the set of threats and (2) the set of resource vulnerability scores associated with each threat from the set of threats;
comparing the resource confidence value to the resource confidence criterion to determine whether the resource confidence criterion is satisfied; and
sending, from the host device, a signal indicative of a positive authentication when the resource confidence value satisfies the resource confidence criterion, such that the client device is granted access to the resource.

11. The method of claim 10, wherein the risk mitigation score represents a mitigation strength of the authentication mode as related to a threat.

12. The method of claim 10, wherein the threat confidence vector includes a plurality of threat confidence values, each threat confidence value from the plurality of threat confidence values being uniquely associated with a threat from the set of threats.

13. The method of claim 10, wherein the authentication mode is at least one of (1) an active authentication mode, in which a user performs an authentication action, or (2) a passive authentication mode, in which a user substantially does not perform an authentication action.

14. The method of claim 10, further comprising:
sending, from the host device, a signal indicative of a failed authentication when the resource confidence value does not satisfy the resource confidence criterion.

15. The method of claim 10, wherein the resource confidence value decreases over a period of time after the sending of the signal indicative of the positive authentication, the method further comprising:
sending, from the host device and at a predetermined time within the period of time, a signal indicative of a request for authentication verification;
receiving, at the host device and in response to the request for authentication verification, a signal indicative of authentication data; and
updating the resource confidence value based on the authentication data to define an updated resource confidence value.

16. The method of claim 10, wherein the resource confidence value decreases over a period of time after the sending of the signal indicative of the positive authentication, the method further comprising:
sending, from the host device and at a predetermined time within the period of time, a signal indicative of a request for authentication verification;
receiving, at the host device and in response to the request for authentication verification, a signal indicative of authentication data; and
updating the resource confidence value based on the authentication data to define an updated resource confidence value different from the resource confidence value.

17. A method, comprising:
receiving, at a host device operably coupled via a computer network to a client device, a signal indicative of an authentication request for a client device to access a resource, the signal including data associated with a first authentication mode and data associated with a second authentication mode different from the first authentication mode;
calculating a threat confidence vector based on (1) a risk mitigation score associated with the first authentication mode and a set of threats, and (2) a risk mitigation score associated with the second authentication mode and the set of threats;
calculating a resource confidence value for the resource based on (1) the threat confidence vector and (2) a set of resource vulnerability scores associated with the resource and each threat from the set of threats, the resource confidence value for the resource representing a degree of confidence associated with an ability of both the first authentication mode and the second authentication mode to mitigate each threat from the set of threats affecting the resource;
defining a resource confidence criterion for the resource based at least in part on (1) at least one risk mitigation score associated with each threat from the set of threats and (2) the set of resource vulnerability scores associated with each threat from the set of threats;
comparing the resource confidence value to the resource confidence criterion to determine whether the resource confidence criterion is satisfied; and
sending, from the host device to the client device, a signal indicative of a positive authentication when the resource confidence value satisfies the resource confidence criterion such that the client device is granted access to the resource.

18. The method of claim 17, wherein the first authentication mode is an active authentication mode and the second authentication mode a passive authentication mode.

19. The method of claim 17, wherein the first authentication mode uses at least one of a voice recognition, or a biometric scan.

20. The method of claim 17, wherein the second authentication mode uses at least one of a geolocation identifier, an internet protocol (IP) address, a hard token, a session cookie, a software version, a proximity sensor, or a transaction.

21. The method of claim 17, wherein the resource confidence value decreases over a period of time after the sending of the signal indicative of the positive authentication, the method further comprising:
sending, from the host device and during the period of time, a signal indicative of a request for authentication verification when the resource confidence value satisfies a criterion;
receiving, at the host device, a signal indicative of authentication data; and
updating the resource confidence value based on the authentication data to define an updated resource confidence value.

22. The method of claim 17, wherein the first authentication mode uses at least one of a knowledge-based authentication mode, a possession-based authentication mode, a biometric-based authentication mode, and a location-based authentication mode, the second authentication mode being different from the first authentication mode and using at least one of a knowledge-based authentication mode, a possession-based authentication mode, a biometric-based authentication mode, and a location-based authentication mode.

* * * * *